(12) United States Patent
Papamanthou et al.

(10) Patent No.: US 12,368,596 B2
(45) Date of Patent: Jul. 22, 2025

(54) SYSTEMS AND METHODS FOR CRYPTOGRAPHY

(71) Applicant: Lagrange Labs Inc., New York, NY (US)

(72) Inventors: Charalampos Papamanthou, Fairfield, CT (US); Shravan Srinivasan, Gaithersburg, MD (US); Nicolas Gailly, Paris (FR); Ismael Hishon-Rezaizadeh, New York, NY (US); Andrus Salumets, Amsterdam (NL); Stjepan Golemac, Spilt (HR)

(73) Assignee: Lagrange Labs Inc., New York, NY (US)

( * ) Notice: Subject to any disclaimer, the term of this patent is extended or adjusted under 35 U.S.C. 154(b) by 0 days.

(21) Appl. No.: 18/661,204

(22) Filed: May 10, 2024

(65) Prior Publication Data

US 2025/0030553 A1 Jan. 23, 2025

Related U.S. Application Data

(63) Continuation of application No. PCT/US2024/028760, filed on May 10, 2024.
(Continued)

(30) Foreign Application Priority Data

Mar. 15, 2024 (GR) .............................. 20240100201

(51) Int. Cl.
*H04L 9/32* (2006.01)
*H04L 9/00* (2022.01)

(52) U.S. Cl.
CPC .............. *H04L 9/3236* (2013.01); *H04L 9/50* (2022.05)

(58) Field of Classification Search
CPC ........................................................ H04L 9/50
See application file for complete search history.

(56) References Cited

U.S. PATENT DOCUMENTS

| | | | |
|---|---|---|---|
| 2020/0252221 A1 | 8/2020 | Zamani et al. | |
| 2021/0240474 A1* | 8/2021 | Minehan | G06Q 20/389 |

(Continued)

FOREIGN PATENT DOCUMENTS

EP 3736760 A1 11/2020

OTHER PUBLICATIONS

Albrecht, M.R., Cini, V., Lai, R.W., Malavolta, G. and Thyagarajan, S.A., Aug. 2022, Lattice-based SNARKs: publicly verifiable, pre-processing, and recursively composable. In Annual International Cryptology Conference (pp. 102-132). Cham: Springer Nature Switzerland. (Year: 2022).*

(Continued)

*Primary Examiner* — Luu T Pham
*Assistant Examiner* — Edward X Long
(74) *Attorney, Agent, or Firm* — WILSON SONSINI GOODRICH & ROSATI

(57) ABSTRACT

A cryptographic method of performing a maintainable Merkle-based vector commitment is provided. The method comprises: a) computing a succinct batch proof of a subset of k leaves in a Merkle tree of n leaves using a recursive succinct non-interactive arguments of knowledge (SNARK), where the recursive SNARK is run directly on Merkle paths belonging to elements in the batch to perform the computation of the subset hash inside the computation of the Merkle verification, using operations comprising: i) verifying that the elements belong to the Merkle tree, ii) computing a batch hash for the elements in the batch using canonical hashing and iii) making the batch hash part of the public statement; and b) maintaining a data structure that stores (Continued)

previously computed recursive proofs; and c) updating the succinct batch proof, upon change of an element of the Merkle tree, in logarithmic time.

30 Claims, 14 Drawing Sheets

Related U.S. Application Data

(60) Provisional application No. 63/551,475, filed on Feb. 8, 2024, provisional application No. 63/533,919, filed on Aug. 22, 2023, provisional application No. 63/465,874, filed on May 12, 2023, provisional application No. 63/465,872, filed on May 11, 2023.

(56) References Cited

U.S. PATENT DOCUMENTS

| | | | | |
|---|---|---|---|---|
| 2023/0318837 | A1* | 10/2023 | Oh | H04L 9/3218 713/168 |
| 2024/0281267 | A1* | 8/2024 | Richter | G06F 11/3438 |

OTHER PUBLICATIONS

Zhao, H., Ding, D., Wang, F., Hua, P., Wang, N., Wu, Q. and Chai, Z., 2022. Hardware acceleration of number theoretic transform for zk-SNARK. Engineering Reports, p. e12639. (Year: 2023).*
Šimunić, S., Bernaca, D. and Lenac, K., 2021. Verifiable computing applications in blockchain. IEEE access, 9, pp. 156729-156745. (Year: 2021).*
Baskaran, M.M. and Bordawekar, R., 2009. Optimizing sparse matrix-vector multiplication on GPUs. IBM research report RC24704, (W0812-047). (Year: 2009).*
Guan, Z., Wan, Z., Yang, Y., Zhou, Y. and Huang, B., 2020. BlockMaze: An efficient privacy-preserving account-model blockchain based on zk-SNARKs. IEEE Transactions on Dependable and Secure Computing, 19(3), pp. 1446-1463. (Year: 2020).*
Chen, T., Lu, H., Kunpittaya, T. and Luo, A., 2022. A review of zk-snarks. arXiv preprint arXiv:2202.06877. (Year: 2022).*
Andreeva, Elena. et al. Compactness of Hashing Modes and Efficiency Beyond Merkle Tree. Eurocrypt. 12697:92-123 (2021).
Chen, Richard. Intro to Recursive SNARKs. Medium, Apr. 1, 2023. [retrieved on Sep. 3, 2024]. Available at URL:https://mediumcom/@richardchen_81235/intro-to-recursive-snarks-50d201796109 pp. 1-18.
PCT/US2024/028760 International Search Report and Written Opinion dated Aug. 22, 2024.
Alexander, Chepurnoy et al. Edrax: A Cryptocurrency with Stateless Transaction Validation Cryptology ePrint Archive, Report 2018/968 pp. 1-18 (2018).
Boneh, Dan et al. Short Signatures from the Weil Pairing. Journal of Cryptology vol. 17: pp. 297-319 (2001).
Catalano, Dario et al. Vector Commitments and Their Applications. Lecture Notes in Computer Science vol. 7778 : pp. 55-72 (2013).
Chiesa, Alessandro et al. Cluster Computing in Zero Knowledge. Cryptology ePrint Archive, Paper 2015/377, pp. 1-42 (2015). Retrieved from internet: https://eprint.iacr.org/2015/377.pdf.
Dean, Jeffrey et al. MapReduce: Simplified Data Processing on Large Clusters. In OSDI'04: Sixth Symposium on Operating System Design and Implementation: pp. 1-13 (2004).
Deng, sai et al. zkTree: A Zero-Knowledge Recursion Tree with ZKP Membership Proofs. Polymer Labs, Paper 2023/208, pp. 1-9 (2023) https://eprint.iacr.org/2023/208.
Ethereum.org. Nodes and clients. pp. 1-15 (2024) Retrieved from internet : https://ethereum.org/en/developers/docs/nodes-and-clients/.
Gorbunov, Sergey et al. Point-proofs: Aggregating Proofs for Multiple Vector Commitments. In Proceedings of the 2020 ACM SIGSAC Conference on Computer and Communications Security pp. 1-33 (2020).
Grassi, Lorenzo et al. Poseidon: A New Hash Function for Zero-Knowledge Proof Systems. This paper is included in the Proceedings of the 30th USENIX Security Symposium USENIX Association. pp. 519-535 (2021) https://www.usenix.org/conference/usenixsecurity21/presentation/grassi.
Jens, Groth. On the Size of Pairing-Based Non-interactive Arguments. In Advances in Cryptology—Eurocrypt, pp. 1-25 (2016).
Josh, Benaloh et al. One-Way Accumulators: A Decentralized Alternative to Digital Signatures. In Eurocrypt 93. International Association for Cryptologic Research pp. 1-12 (1994).
Kothapalli, Abhiram et al. Nova: Recursive Zero-Knowledge Arguments from Folding Schemes. In Advances in Cryptology—Crypto 2022—42nd Annual International Cryptology Conference vol. 13510 : pp. 359-388 (2022).
Liu, Jing et al. Matproofs: Maintainable Matrix Commitment with Efficient Aggregation. In Proceedings of the 2022 ACM SIGSAC Conference on Computer and Communications Security (CCS '22) pp. 2041-2054 (2022).
Merkle Patricia Trie. pp. 1-9 (2024). Retrieved from internet: https://ethereum.org/en/developers/docs/data-structures-and-encoding/patricia-merkle-trie/.
Merkle, Ralph C et al. Certified Digital Signature. In Advances in Cryptology—Crypto '89, 9th Annual International Cryptology Conference, Proceedings, Gilles Brassard (Ed.), vol. 435: pp. 218-238 (1989).
Ozdemir, Alex et al. Scaling Verifiable Computation Using Efficient Set Accumulators. In 29th Usenix Security Symposium (USENIX Security 20). USENIX Association, pp. 2075-2092 (2020). Retrieved from internet: https://www.usenix.org/conference/usenixsecurity20/presentation/ozdemir.
Plonky2 Polygon. Fast recursive arguments with PLONK and FRI. pp. 1-16 (2022). Retrieved from internet: https://github.com/mir-protocol/plonky2/blob/main/plonky2/plonky2.pdf.
Srinivasan, Shravan et al. Hyperproofs: Aggregating and Maintaining Proofs in Vector Commitments. In 31st USENIX Security Symposium (USENIX Security 22), pp. 3001-3018 (2022).https://www.usenix.org/conference/usenixsecurity22/presentation/srinivasan.
Tomescu, Alin et al. Aggregatable Subvector Commitments for Stateless Cryptocurrencies. In Security and Cryptography for Networks, Clemente Galdi and Vladimir Kolesnikov pp. 45-64 (2020).
Tomescu, Alin et al. Towards Scalable Threshold Cryptosystems. In 2020 IEEE Symposium on Security and Privacy (SP). pp. 877-893 (2020).
Unknown, Qope. 2023. plonky2-bn254; public. Githubs.com. 5 pages, (2024). Retrieved from: https://web.archive.org/web/20240402225311/https://github.com/qope/plonky2-bn254.
Unknown, Securely Scaling ZK Interoperability. Larange. 4 pages (2023). Retrieved from internet: https://web.archive.org/web/20230521112134/https://www.lagrange.dev/.
Wang, Weijie et al. Balance Proofs: Maintainable Vector Commitments with Fast Aggregation. This paper is included in the Proceedings of the 32nd Usenix Security Symposium, pp. 4409-4426 (2023). https://www.usenix.org/system/files/usenixsecurity23-wang-weijie.pdf.
Zhang, Yupeng et al. vSQL: Verifying Arbitrary SQL Queries over Dynamic Outsourced Databases. IEEE Symposium on Security and Privacy (SP): pp. 1-22 (2017).

* cited by examiner

Circuit $\mathcal{B}$ ⟵ 200

Public input: $(vk, C, d)$
Witness: $(C_L, d_L, \pi_L)$ and $(C_R, d_R, \pi_R)$

Computation:

1. Check $C = H(C_L \| C_R)$;
2. If $d_R \cdot d_L \neq 0$ check $d = H(d_L \| d_R)$ else check $d = d_L + d_R$;
3. If $d_L \neq 0$ check Verify$(vk, (vk, C_L, d_L), \pi_L)$ or $C_L = d_L$;
4. If $d_R \neq 0$ check Verify$(vk, (vk, C_R, d_R), \pi_R)$ or $C_R = d_R$;
5. Return true;

FIG. 2

$\underline{\text{Gen}(1^\lambda, n) \to pp}$: Let pp contain the following:
- The size of the vector $n$.
- A collision-resistant hash function H.
- $(pk, vk) \leftarrow \text{Setup}(1^\lambda, \mathcal{B})$, where $\mathcal{B}$ is the circuit in Fig. 2.

$\underline{\text{Com}_{pp}(a) \to C}$: Return the Merkle root.

$\underline{\text{Open}_{pp}(i, a) \to \pi_i}$: Return the Merkle proof for element $a_i$.

$\underline{\text{OpenAll}_{pp}(a) \to (\pi_0, \ldots, \pi_{n-1})}$: Return the Merkle tree.

$\underline{\text{Agg}_{pp}((a_i, \pi_i)_{i \in I}) \to (\pi_I, \Lambda_I)}$:
- Using $\{\pi_i\}_{i \in I}$ and $I$, compute the Merkle hash $C_v$ and the canonical digest $d(v, I)$ for every node in $v \in T_I$, where $T_I$ is defined in Section 3.3.
- Let $T'_I$ be the subtree of $T_I$ as defined in Section 3.3.
- For all nodes $v$ in $T'_I$ compute $\pi_v$ as in Equation 1.
- Return $\pi_I$ as $\pi_r$ where $r$ is the root of $T_I$ and $\Lambda_I$ as $T_I$ along with the values
$$\{(C_v, d(v, I), \pi_v)\}_{v \in T_I}.$$

$\underline{\text{Ver}_{pp}(C, (a_i)_{i \in I}, \pi_I) \to \{0, 1\}}$:
- Using $(a_i)_{i \in I}$, compute $d_I$ as in Section 3.1.
- Return $\text{Verify}(vk_{\mathcal{B}}, (vk_{\mathcal{B}}, C, d_I), \pi_I)$.

$\underline{\text{UpdDig}_{pp}(u, \delta, C, \text{aux}) \to C'}$:
- Parse aux as $\pi_u$.
- Return the Merkle root after updating to $a_u + \delta$.

$\underline{\text{UpdProof}_{pp}(u, \delta, \pi_i, \text{aux}) \to \pi'_i}$:
- Parse aux as $\pi_u$.
- Recompute the Merkle path after updating to $a_u + \delta$.
- Update affected portions of $\pi_i$.

$\underline{\text{UpdBatchProof}_{pp}(u, \delta, \pi_I, \Lambda_I, \text{aux}) \to (\pi'_I, \Lambda'_I)}$:
- Parse aux as $\pi_u$.
- Recompute the Merkle path after updating to $a_u + \delta$.
- For every node $v$ in $\Lambda_I$ affected by update do the following.
  - Update the Merkle hash value.
  - Recompute the canonical hash $d(v, I)$ if necessary.
  - Recompute the SNARK proof $\pi_v$ as in Equation 1.
  - Return the updated $\pi_I$ and $\Lambda_I$.

$\underline{\text{UpdAllProofs}_{pp}(u, \delta, \pi_0, \ldots, \pi_{n-1}) \to (\pi'_0, \ldots, \pi'_{n-1})}$:
- Parse aux as $\pi_u$.
- Recompute the Merkle path after updating to $a_u + \delta$.

FIG. 3

Circuit $\mathcal{B}_0$

Public input: $(C, d)$
Witness: $(C_L, d_L)$ and $(C_R, d_R)$

Computation:

1. Check $C = H(C_L \| C_R)$;
2. If $d_R \cdot d_L \neq 0$ check $d = H(d_L \| d_R)$ else check $d = d_L + d_R$;
3. If $d_L \neq 0$ check $d_L = C_L$;
4. If $d_R \neq 0$ check $d_R = C_R$;
5. Return true;

Circuit $\mathcal{B}_i$ ($i = 1, \ldots, \ell - 1$)

Public input: $(C, d)$
Witness: $(C_L, d_L, \pi_L)(C_R, d_R, \pi_R)$

Computation:

1. Check $C = H(C_L \| C_R)$;
2. If $d_R \cdot d_L \neq 0$ check $d = H(d_L \| d_R)$ else check $d = d_L + d_R$;
3. If $d_L \neq 0$ check Verify($vk_{i-1}, (C_L, d_L), \pi_L$);
4. If $d_R \neq 0$ check Verify($vk_{i-1}, (C_R, d_R), \pi_R$);
5. Return true;

FIG. 4

Circuit $Q_k$ ($k = 0, ..., q$)

Public input: $C, d, \mathcal{V}$
Witness 1: $(C_1, d_1), ..., (C_q, d_q)$
Witness 2: $(C_{x_1}, d_{x_1}), ..., (C_{x_k}, d_{x_k})$
Witness 3: $(vk_{x_1}, \pi_{x_1}), ..., (vk_{x_k}, \pi_{x_k})$

Computation:

1. Check $vk_{x_1}, ..., vk_{x_k}$ are in $\mathcal{V}$;
2. Check $(C_{x_1}, d_{x_1}), ..., (C_{x_k}, d_{x_k})$ have all non-zero $d_i$'s and that all are a subset of $(C_1, d_1), ..., (C_q, d_q)$
1. Check $C = H(C_1 || C_2 || ... || C_q)$;
2. Check $d = H(d_{x_1} || d_{x_2} || ... || d_{x_k})$;
3. Check Verify $vk_1, (C_{x_1}, d_{x_1})\pi_{x_1})$ or $C_{x_1} = d_{x_1}$;
4. ...
5. Check Verify $vk_{x_k}, (C_{x_k}, d_{x_k}), \pi_k)$ or $C_{x_k} = d_{x_k}$;
6. Return true;

FIG. 5

Circuit $\mathcal{M}$

Public input: (vk, C, $d$, out)

Witness: ($C_L, d_L, \pi_L, out_L$) and ($C_R, d_R, \pi_R, out_R$)

Computation:

1. Check $C = H(C_L \| C_R)$;
2. If $d_R \cdot d_L \neq 0$ check $d = H(d_L \| d_R)$ and out = Reduce ($out_L$, $out_R$)) else check ($d = d_L + d_R$) and out $= out_L + out_R$);
3. If $d_L \neq 0$ check Verify (vk, (vk, $C_L, d_L$), $\pi_L$) or $C_L = d_L$ and $out_L = \text{Map}(C_L)$);
4. If $d_R \neq 0$ check Verify (vk, (vk, $C_R, d_R$), $\pi_R$) or $C_R = d_R$ and $out_R = \text{Map}(C_R)$);
5. Return true;

FIG. 6

Circuit $\mathcal{D}_0$

Public input: $(C_K, C_P)$
Witness: $(C_{KL}, C_{PL}), (C_{PR}, C_{KR})$

Computation:

1. Check $C_K = H_K(C_{KL} \| C_{KR})$;
2. Check $C_P = H_P(C_{PL} \| C_{PR})$;
3. Return true;

Circuit $\mathcal{D}_i (i = 1, \ldots, \ell - 1)$

Public input: $(C_K, C_P)$
Witness: $(C_{KL}, C_{PL}, \pi_L), (C_{PR}, C_{KR}, \pi_R)$

Computation:

1. Check $C_K = H_K(C_{KL} \| C_{KR})$;
2. Check $C_P = H_P(C_{PL} \| C_{PR})$;
3. Check Verify $(vk_i, (C_{KL}, C_{PL}), \pi_L)$;
4. Check Verify $(vk_i, (C_{KR}, C_{KL}), \pi_L)$;
5. Return true;

FIG. 7

Circuit $\mathcal{A}_0$

Public input: $(C, apk, cnt)$
Witness: $(C_L, apk_L, cnt_L), C_R, apk_R, cnt_R)$

Computation:

1. Check $C = H(C_L \| C_R)$;
2. Check $apk = apk_L \cdot apk_R$;
3. Check $cnt = cnt_L + cnt_R$;
4. If $apk_L \neq 1_{\mathbb{G}}$ Check $C_L = apk_L$ and $cnt_L = 1$ else check $cnt_L = 0$;
5. If $apk_R \neq 1_{\mathbb{G}}$ Check $C_R = apk_R$ and $cnt_R = 1$ else check $cnt_R = 0$;
6. Return true;

Circuit $\mathcal{A}_i (i = 1, \ldots, \ell - 1)$

Public input: $(C, apk, cnt)$
Witness: $(C_L, apk_L, cnt_L, \pi_L), C_R, apk_R, cnt_R, \pi_R)$

Computation:

1. Check $C = H(C_L \| C_R)$;
2. Check $apk = apk_L \cdot apk_R$;
3. Check $cnt = cnt_L + cnt_R$;
4. If $apk_L \neq 1_{\mathbb{G}}$ Check Verify $(vk_i, (C_L, apk_L, cnt_L), \pi_L)$ else check $cnt_L = 0$;
5. If $apk_R \neq 1_{\mathbb{G}}$ Check Verify $(vk_i, (C_R, apk_R, cnt_R), \pi_R)$ else check $cnt_R = 0$;
6. Return true;

FIG. 8

SYSTEMS AND METHODS FOR CRYPTOGRAPHY

CROSS-REFERENCE

This application is the by-pass continuation of PCT International Application No. PCT/US2024/028760, filed May 10, 2024, which claims the priority and benefit of U.S. Provisional Application No. 63/465,872, filed May 11, 2023, U.S. Provisional Application No. 63/465,874, filed May 12, 2023, U.S. Application No. 63/533,919, filed Aug. 22, 2023, and U.S. Provisional Application No. 63/551,475, filed Feb. 8, 2024, and Greek patent application Ser. No. 20240, 100201, filed Mar. 15, 2024, each of which is incorporated herein by reference in its entirety.

BACKGROUND

A Merkle tree is a seminal cryptographic data structure that enables a party to commit to a memory M of slots via a succinct digest. A third party with access can verify correctness of any memory slot M[i] via a log-sized and efficiently-computable proof $\pi_i$. Merkle trees can be used to verify untrusted storage efficiently, and have found many applications particularly in the blockchain space, such as in Ethereum state compression via Merkle Patricia Tries (MPTs) stateless validation, zero-knowledge proofs as well as in verifiable cross-chain computation.

Many applications that work with Merkle trees require the use of a Merkle batch proof. A Merkle batch proof $\pi_I$ is a single proof that can be used to prove multiple memory slots $\{M[i]\}_{i \in I}$ at once. When the slots are consecutive, Merkle batch proofs (also known as Merkle range proofs) have logarithmic size, independent of the batch size |I|. In the general case of arbitrary set though, a Merkle batch proof comprises $O(|I| \log \log n)$ hashes. For blockchain applications that have to prove thousands of transactions at once, the lack of succinctness of Merkle batch proofs can become an issue.

SUMMARY

A distinguishing feature of Merkle trees is their support for extremely fast updates: If a memory slot M [j]. of the committed memory M changes, a batch proof $\pi_I$ (as well as the whole Merkle tree) can be updated in logarithmic time with a simple algorithm. This is particularly useful for applications. For instance, when new Ethereum blocks are created and new memory is allocated for use by smart contracts, Ethereum nodes can update their local MPTs (which are q-ary unbalanced Merkle trees), very fast. However, while Merkle trees support blazingly-fast updates of batch proofs, their batch proofs are not succinct, i.e., their size depends on |I|.

The present disclosure addresses the above issues of the conventional Merkle tree by building succinct Merkle batch proofs that are efficiently updatable. In some embodiments of the present disclosure, Reckle trees are provided which is a new vector commitment based on succinct RECursive arguments and MerKLE trees. The Reckle trees herein may be capable of supporting succinct batch proofs that are updatable. This beneficially allows for new applications in the blockchain setting where a proof needs to be computed and efficiently maintained over a moving stream of blocks.

In some cases, the methods herein may comprise embedding a computation of the batch hash inside the recursive Merkle verification via a hash-based accumulator (i.e., canonical hashing). The unique embedding beneficially allows for batch proofs being updated in logarithmic time, whenever a Merkle leaf (belonging to the batch or not) changes, by maintaining a data structure that stores previously-computed recursive proofs. In the cases of parallel computation, the batch proofs are also computable in O (log n) parallel time-independent of the size of the batch.

In alternative embodiments, an extension of Reckle trees or Reckle⁺ trees are provided. Reckle⁺ trees provide updatable and succinct proofs for certain types of Map/Reduce computations. For instance, a prover can commit to a memory M and produce a succinct proof for a Map/Reduce computation over a subset of M. The proof can be efficiently updated whenever the subset or M changes.

In one aspect, disclosed herein is a computer-implemented cryptographic method of performing a maintainable Merkle-based vector commitment. The method comprises: a) computing a succinct batch proof of a subset of k leaves in a Merkle tree of n leaves using a recursive succinct non-interactive arguments of knowledge (SNARK), where the recursive SNARK is run directly on Merkle paths belonging to elements in the batch to perform the computation of the subset hash inside the computation of the Merkle verification, using operations comprising: i) verifying that the elements belong to the Merkle tree, ii) computing a batch hash for the elements in the batch using canonical hashing and iii) making the batch hash part of the public statement; and b) maintaining a data structure that stores previously computed recursive proofs; and c) updating the succinct batch proof, upon change of an element of the Merkle tree, in logarithmic time.

In some embodiments, the succinct batch proof is computed in O(log n) parallel time. In some embodiments, the succinct batch proof size is 112 KiB, independent of the batch size and the size of the vector. In some embodiments, the update to the succinct batch proof is performed in about 16.61 seconds, or less, for a tree height of 27. In some embodiments, the verification is performed in about 18.2 ms, or less.

In some embodiments, the element of the Merkle tree changed is in the batch. In some embodiments, the element of the Merkle tree changed is not in the batch. In some embodiments, the method applied to dynamic digest translation. In some embodiments, the method applied to updateable Boneh-Lynn-Shacham (BLS) keys aggregation.

In a related yet separate aspect, disclosed herein is a computer-implemented system comprising at least one processor and instructions executable by the at least one processor to cause the at least one processor to perform a maintainable Merkle-based vector commitment by performing operations comprising: a) computing a succinct batch proof of a subset of k leaves in a Merkle tree of n leaves using a recursive succinct non-interactive arguments of knowledge (SNARK), where the recursive SNARK is run directly on Merkle paths belonging to elements in the batch to perform the computation of the subset hash inside the computation of the Merkle verification, using operations comprising: i) verifying that the elements belong to the Merkle tree, ii) computing a batch bash for the elements in the batch using canonical hashing and iii) making the batch hash part of the public statement; and b) maintaining a data structure that stores previously computed recursive proofs; and c) updating the succinct batch proof, upon change of an element of the Merkle tree, in logarithmic time.

In some embodiments, the succinct batch proof is computed in O(log n) parallel time. In some embodiments, the succinct batch proof size is 112 KiB, independent of the batch size and the size of the vector. In some embodiments, the update to the succinct batch proof is performed in about 16.61 seconds, or less, for a tree height of 27. In some embodiments, the verification is performed in about 18.2 ms, or less.

In some embodiments, the element of the Merkle tree changed is in the batch. In some embodiments, the element of the Merkle tree changed is not in the batch.

In some embodiments, the maintainable Merkle-based vector commitment is applied to dynamic digest translation. In some embodiments, the maintainable Merkle-based vector commitment is applied to updateable BLS aggregation.

In another related yet separate aspect, disclosed herein is one or more non-transitory computer-readable storage media encoded with instructions executable by one or more processors to create an application for performing a maintainable Merkle-based vector commitment, the application comprising: a) a software module computing a succinct batch proof of a subset of k leaves in a Merkle tree of n leaves using a recursive SNARK, wherein the recursive SNARK is run directly on Merkle paths belonging to elements in the batch to perform the computation of the subset hash inside the computation of the Merkle verification, by operations comprising: i) verifying that the elements belong to the Merkle tree, ii) computing a batch hash for the elements in the batch using canonical hashing and iii) making the batch hash part of the public statement; b) a software module maintaining a data structure that stores previously computed recursive proofs; and c) a software module updating the succinct batch proof, upon change of an element of the Merkle tree, in logarithmic time.

In some embodiments, the succinct batch proof is computed in O(log n) parallel time. In some embodiments, the succinct batch proof size is 112 KiB, independent of the batch size and the size of the vector. In some embodiments, the update to the succinct batch proof is performed in about 16.61 seconds, or less, for a tree height of 27. In some embodiments, the verification is performed in about 18.2 ms, or less.

In some embodiments, the element of the Merkle tree changed is in the batch. In some embodiments, the element of the Merkle tree changed is not in the batch.

In some embodiments, the application further comprises a software module performing dynamic digest translation. In some embodiments, the application further comprises a software module performing updateable BLS aggregation.

The method herein can be applied in blockchain space. For example, the method for providing parallelizable and updatable batch proofs may be applied in a decentralized network. The method comprises: accessing a first block added to a blockchain; computing a proof of the first block by computing a succinct batch proof of a subset of k leaves in a Merkle tree of n leaves using a recursive SNARK, where the subset of k leaves corresponds to a subset of attestors of the decentralized network; and upon proofing the first block, issuing a token for the proof. The subset of attestors change when a second block is added to the blockchain and such change can be updated with improved efficiency. In some cases, the batch proof is performed by log n different circuits and each of the different circuits has a fixed size corresponding to a level of the Merkle tree.

In some embodiments, a decentralized protocol, run by a plurality of computers, issues a cryptocurrency token via a smart contract, where the token is traded on an exchange. The decentralized protocol incorporates the above system or method so that value of the token is influenced by the market interest in the above system. For instance, the market interest includes usage of the above system.

In some embodiments, the token is used in transacting with the above system, while using the above system, while operating the computer(s) running the above system, and/or rewarding the operators of the computers running the above system. For instance, the token is used to provide economic incentives to operators of the above system so as to enable its operation in a decentralized manner and/or for user of the system to pay for usage of the system.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, and the accompanying drawings (also "Figure" and "FIG." herein), of which:

FIG. 2 depicts a non-limiting example of a batch proof recursive circuit for RECKLE TREES.

FIG. 3 depicts a non-limiting example of algorithm for implementation of RECKLE TREES.

FIG. 4 depicts a non-limiting example of an optimized batch proof circuits for RECKLE TREES.

FIG. 5 depicts a non-limiting example of a circuit for batch proof in q-ary tree Reckle tree.

FIG. 6 depicts a non-limiting example of a Map/Reduce circuit for RECKLE+ TREES.

FIG. 7 depicts a non-limiting example of an optimized digest translation circuit.

FIG. 8 depicts a non-limiting example of an optimized BLS aggregation circuit.

DETAILED DESCRIPTION

Figure 1:
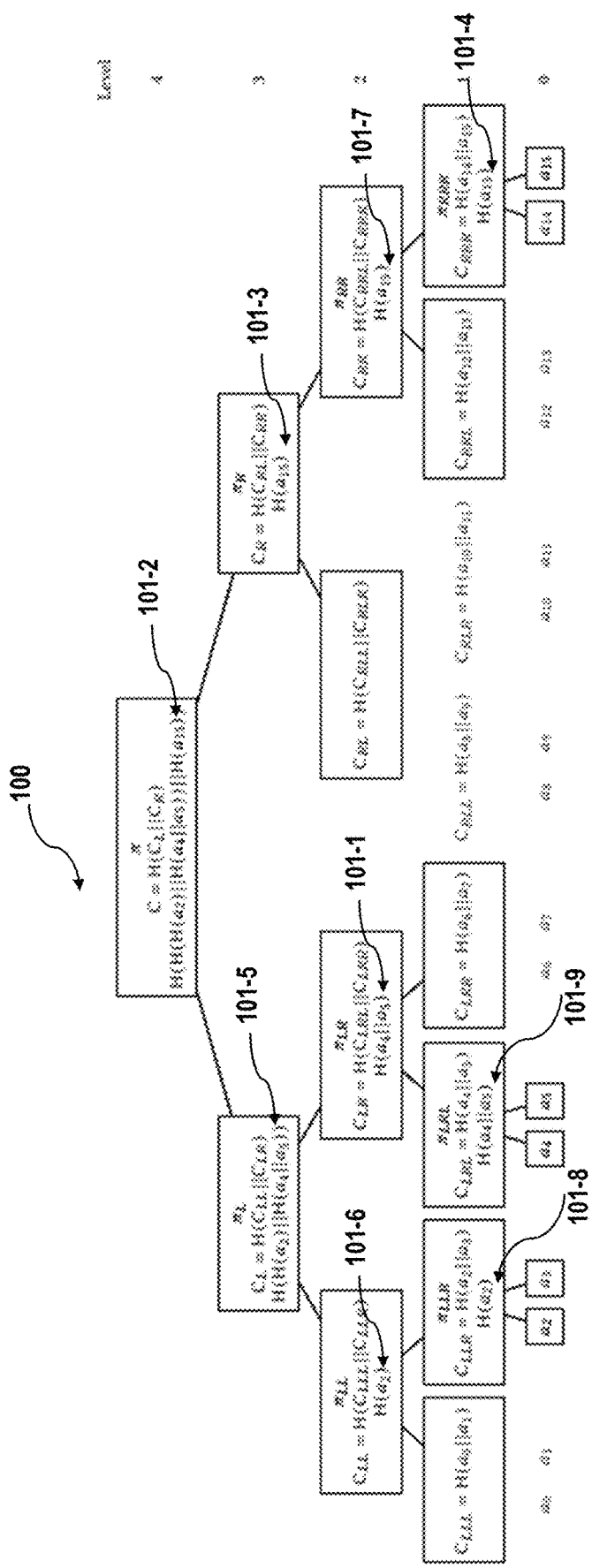
FIG. 1 depicts a non-limiting example of a Merkle tree.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Certain Definitions

Unless otherwise defined, all technical terms used herein have the same meaning as commonly understood by one of ordinary skills in the art to which this invention belongs.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit," "module" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g, data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As used herein a processor encompasses one or more processors, for example a single processor, or a plurality of processors of a distributed processing system for example. A controller or processor as described herein generally comprises a tangible medium to store instructions to implement steps of a process, and the processor may comprise one or more of a central processing unit, programmable array logic, gate array logic, or a field programmable gate array, for example. In some cases, the one or more processors may be a programmable processor (e.g., a central processing unit (CPU) or a microcontroller), digital signal processors (DSPs), a field programmable gate array (FPGA) and/or one or more Advanced RISC Machine (ARM) processors. In some cases, the one or more processors may be operatively coupled to a non-transitory computer readable medium. The non-transitory computer readable medium can store logic, code, and/or program instructions executable by the one or more processors unit for performing one or more steps. The non-transitory computer readable medium can include one or more memory units (e.g., removable media or external storage such as an SD card or random access memory (RAM)). One or more methods or operations disclosed herein can be implemented in hardware components or combinations of hardware and software such as, for example, ASICs, special purpose computers, or general purpose computers.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As described above, a Merkle tree is a seminal cryptographic data structure that enables a party to commit to a memory M of slots via a succinct digest. A third party with access can verify correctness of any memory slot M [i] via a log-sized and efficiently-computable proof $\pi_i$. Merkle trees can be used to verify untrusted storage efficiently, and have found many applications particularly in the blockchain space, such as in Ethereum state compression via Merkle Patricia Tries (MPTs) stateless validation, zero-knowledge proofs as well as in verifiable cross-chain computation. A distinguishing feature of Merkle trees is their support for extremely fast updates: If a memory slot M[j]. of the committed memory M changes, a batch proof $\pi_I$ (as well as the whole Merkle tree) can be updated in logarithmic time with a simple algorithm. This is particularly useful for applications. For instance, when new Ethereum blocks are created and new memory is allocated for use by smart contracts, Ethereum nodes can update their local MPTs (which are q-ary unbalanced Merkle trees), very fast. However, while Merkle trees support blazingly-fast updates of batch proofs, their batch proofs are not succinct, i.e., their size depends on |I|.

However, while Merkle trees support blazingly-fast updates of batch proofs, their batch proofs are not succinct, i.e., their size depends on |I|. Current approaches used to build batch proofs and Merkle computation proofs suffer from drawbacks. For instance, recursive batch proofs via tree-of-proofs approach which is an application of recursive SNARKs in computing succinct Merkle batch proofs-using a "tree of proofs" approach: Suppose one wants to compute a Merkle batch proof $\pi_I$ for an index set I. In the first step a SNARK circuit is built for verifying a single Merkle proof. This SNARK is executed |I| times, outputting a SNARK proof pi for every index i ∈ I. Then a binary tree is built with all proofs $p_i$ as leaves. For every node υ of the binary tree a recursive SNARK is executed (outputting a proof $p_υ$) that verifies the proofs coming from υ's children. This process continues up to the root and the batch proof is defined as the final recursive proof $p_r$ of the root. Unfortunately, the produced batch proof is not updatable. If an element of the tree or the batch changes, all proofs at the leaves will be affected and therefore the whole procedure must be executed from scratch, requiring computational work that is proportional to the size of the batch. In addition, in such "tree of proofs" approach, if two indices share common structure in their Merkle proofs (e.g., successive indices), the same hash computations will be repeating within the two circuits corresponding to those leaves, unnecessarily consuming computational resources.

Another example approach for succinct batch proofs is vector-commitment approach. Succinct batch proofs can be computed using vector commitments. Vector commitments are typically algebraic constructions as opposed to hash-based Merkle trees. With vector commitments a batch proof for |I| elements has size either optimal O(1) or logarithmic, but always independent of the batch size |I|. However, while vector commitments achieve optimal batch proof sizes, they face other challenges. In particular, the majority of vector commitments are not updatable: As opposed to Merkle trees, whenever a single memory slot changes, Ω(n) time is required to update all individual proofs, which can be a bottleneck for many applications. While there are some vector commitments that can update proofs in logarithmic time (while having succinct batch proofs), those suffer from increased concrete batch proof sizes, large public parameters and high aggregation and verification times (At the same time, their batch proofs are not updatable.) For example, a Hypeproof batch proof for a thousand memory slots requires access to gigabytes of data to be generated and approximately 17 seconds to be verified.

A third example for Merkle computation proofs is the Merkle-SNARK approach. Vector commitments can handle only memory content. To enable arbitrary computation over Merkle leaves one of course can build a SNARK that verifies Merkle proofs and then performs computation via a monolithic circuit, but this is typically very expensive (Such an approach also leaves very little space for massive parallelism since proof computation can be parallelized only to the extent that the prover of underlying SNARK can be parallelized.) For instance, computing a SNARK-based proof that verifies a thousand memory slots on a Poseidon-based 30-deep Merkle tree can take up to 20 minutes—and this excludes any computation that one might wish to perform on the leaves. To make things worse, any updates to the memory M would be required.

The present disclosure addresses the above issues of the conventional Merkle tree or Merkle computation proofs approaches by building succinct Merkle batch proofs that are efficiently updatable. In some embodiments of the present disclosure, Reckle trees are provided which is a new vector commitment based on succinct RECursive arguments and MerKLE trees. The Reckle trees herein may be capable of supporting succinct batch proofs that are updatable. This beneficially allows for new applications in the blockchain setting where a proof needs to be computed and efficiently maintained over a moving stream of blocks.

Map/Reduce proofs with RECKLE+ TREES. Merkle trees may not support updatable verifiable computation over Merkle leaves. Merkle trees can only be used to prove memory content, but no computation over it. However, in certain applications (e.g., smart contract), it is desirable to compute an updatable proof for some arbitrary computation over the Merkle leaves, e.g., counting the number of Merkle leaves u satisfying an arbitrary function f (υ)=1. For example, smart contracts can benefit by accessing historic chain MPT data to compute useful functions such as price volatility or BLS aggregate keys. Instead, such applications are currently enabled by the use of blockchain "oracles" that have to be blindly trusted to expose the correct output to the smart contract. In some embodiments, the present disclosure provides RECKLE+ TREES, an extension of RECKLE+ TREES that support updatable verifiable computation over Merkle leaves With RECKLE+ TREES, a prover can commit to a memory M, and provide a proof of correctness for Map/Reduce computation on any subset of M.

In some embodiments, the RECKLE+ TREES may be technically achieved by encoding, in the recursive circuit, not only the computation of the canonical hash and the Merkle hash (as we would do in the case of batch proofs), but also the logic of the Map and the Reduce functions. The final Map/Reduce proof can be easily updated whenever the subset changes, without having to recompute it from scratch.

In some cases, the methods herein may comprise embedding a computation of the batch hash inside the recursive Merkle verification via a bash-based accumulator (i.e, canonical hashing). The unique embedding beneficially allows for batch proofs being updated in logarithmic time, whenever a Merkle leaf (belonging to the batch or not) changes, by maintaining a data structure that stores previously-computed recursive proofs. In the cases of parallel computation, the batch proofs are also computable in O(log n) parallel time-independent of the size of the batch.

In alternative embodiments, an extension of Reckle trees or Reckle+ trees are provided Reckle+ trees provide updatable and succinct proofs for certain types of Map/Reduce computations. For instance, a prover can commit to a memory M and produce a succinct proof for a Map/Reduce computation over a subset of M. The proof can be efficiently updated whenever or M changes.

Whether succinct Merkle batch proofs can be built that are efficiently updatable relates to the notion of updatable SNARKs, that are disclosed herein. An updatable SNARK is a SNARK that is equipped with an additional algorithm $\pi' \leftarrow$ Update ((x, w), (x', w'), π). Where the update function takes as input a true public statement x along with its witness w and its verifying proof π as well as an updated true public statement x' along with the updated witness w'. It outputs a verifying proof π' for x' without running the prover algorithm from scratch and ideally in time proportional to the distance (for some definition of distance) of (x, w) and (x', w').

RECKLE TREES

In some embodiments of the present disclosure, a reckle tree is provided. The reckle tree may be a unique vector commitment scheme that supports updatable and succinct batch proofs using RECursive SNARKs and MerKLE trees. The term "vector commitment" as utilized herein generally refers to a cryptographic abstraction for "verifiable storage" and which can be implemented, for example, by Reckle trees or Merkle trees.

A recursive SNARK is a SNARK that can call its verification algorithm within its circuit. Some of the SNARKs may be optimized for recursion, e.g., via the use of special curves. The framework disclosed herein may be compatible with any recursive SNARK (e.g., Plonky2).

RECKLE TREES may work under a fully-dynamic setting for batch proofs: Assume a Reckle batch proof $\pi_I$ for a subset I of memory slots has been computed. RECKLE TREES can support the following updates to $\pi_I$ in logarithmic time: (a) change the value of element M [i], where i ∈ I; (b) change the value of element M [j], where j ∉ I; (c) extend the index set I to I ∪ w so that M [w] is also part of the batch; (d) remove index w from I so that M [w] is not part of the batch; (e) remove or add an element from the memory altogether. In this case, RECKLE TREES can rebalance following the same rules of standard data structures such as red-black trees or AVL trees.

In some cases, updating a batch proof $\pi_I$ in RECKLE TREES is achieved through a batch-specific data structure $\wedge_I$ that stores recursively-computed SNARKs proofs. RECKLE TREES can be naturally parallelizable. Assuming enough parallelism, any number of updates T>1 can be performed in O(log n) parallel time. For instance, a massively-parallel RECKLE TREES implementation can achieve up to 270× speedup over a sequential implementation.

RECKLE TREES may have particularly low memory requirements: While they can make statements about n leaves, their memory requirements (excluding the underlying linear-size Merkle tree) scale logarithmically with n. Additionally, Reckle trees have the flexibility of not being tied to a specific SNARK: If a faster recursive SNARK implementation is introduced in the future (e.g., folding schemes), Reckle trees can use the faster technology seamlessly.

In some embodiments, the method may comprise: letting I be the set of Merkle leaf indices for which to compute the batch proof, starting from the leaves $l_1, \ldots, l_{|I|}$ that belong to the batch l, RECKLE TREES run the SNARK recursion on the respective Merkle paths $p_1, \ldots, p_{|I|}$, merging the paths when common ancestors of the leaves in I are encountered. While the paths are being traversed, RECKLE TREES may verify that the elements in I belong to the Merkle tree as well as compute a "batch" hash for the elements in I, eventually making this batch hash part of the public statement.

In some cases, the batch hash is computed via canonical hashing, a deterministic and secure way to represent any subset of |I| leaves succinctly. FIG. 1 shows an example of a Merkle tree 100 of 16 leaves. The subset of Merkle leaf indices for which to compute the batch proof may be the subset {2, 4, 5, 15} as shown in FIG. 1. At every node, the canonical hash of that node with respect to the subset {2, 4, 5, 15} 101-1, 101-2, 101-3, 101-4, 101-5, 101-6, 101-7, 101-8, 101-9 is shown. For the nodes with no hash for the subset, their canonical hash is 0. Details about the canonical hash are described later herein.

It should be noted that any number-theoretic accumulator (or even the elements in the batch themselves) can be utilized. In some cases, the method herein may select canonical hashing to avoid encoding algebraic statements within the circuits. This beneficially ensures the circuits' size not depend on the size and topology of the batch. If the final recursive proof verifies, that means that the batch hash corresponds to a valid subset of elements in the tree, and can be recomputed using the actual claimed batch as an input. The Reckle tree herein may distinguish from the conventional Merkle tree construction that every node υ in a Reckle tree, in addition to storing a Merkle hash $C_υ$, can also store a recursively-computed SNARK proof $\pi_υ$, depending on whether any of υ's descendants belongs to the batch I in question or not (For nodes that have no descendants in the batch, there is no need to store a SNARK proof.) The approach or methods herein can be easily extended to unbalanced q-ary Merkle trees (that model Ethereum MPTs) as described later herein.

Methods to Build Batch Proofs and Merkle Computation Proofs

Definitions and Notations for SNARKs, Merkle Trees and Vector Commitments:

Let λ be the security parameter and H: $\{0, 1\}+ \rightarrow \{0, 1\}^{2\lambda}$ denote a collision-resistant hash function. Let [n]=[0, n)={0, 1, ..., n−1}, and $r \in_R S$ denote picking an element from S uniformly at random. Bolded, lower-case symbols such as a=[$a_0, \ldots, a_n-1$] typically denote vector of binary strings, where $a_i \in \{0, 1\}^{2\lambda}$. ∀i ∈ [n]. If $a_i$'s are arbitrarily long, we use the H function to reduce it to a fixed size. |a| denotes the size of the vector a.

Succinct Non-Interactive Arguments of Knowledge. Let $\mathcal{R}$ be an Efficiently computable binary relation that consists of pairs of the form (x, w), where x is a statement and w is a witness.

Definition 2.1. A SNARK is a triple of PPT algorithms Π=(Setup, Prove, Verify) defined as follows:

Setup ($1^\lambda \mathcal{R}$,)→(pk, vk): On input security parameter λ and the binary relation $\mathcal{R}$, it outputs a common reference string consisting of the prover key and the verifier key (pk, vk).

Prove (pk,x,w), π: On input pk, a statement x and the witness w, it outputs a proof π.

Verify (vk,, x π)→(1/0): On input vk, a statement x, and a proof π, it outputs either 1 indicating accepting the statement or 0 for rejecting it.

It also satisfies the following properties:

Completeness: For all (x, w)∈ $\mathcal{R}$, the following holds:

$$Pr\big((pk, vk) \leftarrow \text{Setup}\,[1^\lambda, R\pi \leftarrow \text{Prove}\,(pk, x, w)\big) = 1$$

Knowledge Soundness: For any PPT adversary A, there exists a PPT extractor $X_A$ such that the following probability is negligible in λ:

$$Pr\big((pk, vk) \leftarrow \text{Setup}\big(1^\lambda, R((x, \pi); w) \leftarrow A \| X_A((pk, vk))\big)$$

(The notation $((x, \pi); w) \leftarrow A \| X_A ((pk, vk))$ means the following: After the adversary A outputs $(x, \pi)$, we can run the extractor $X_A$ on the adversary's state to output w. The intuition is that if the adversary outputs a verifying proof, then it must know a satisfying witness that can be extracted by looking into the adversary's state.)

Succinctness: For any x and w, the length of the proof $\pi$ is given by $|\pi|=\text{poly}(\lambda) \text{ polylog}(|x|+|w|)$.

Merkle Trees. Let M be a memory of $n=2^l$ slots. A Merkle tree is an algorithm to compute a succinct, collision-resistant representation C of M (also called digest) so that one can provide a small proof for the correctness of any memory slot M [i], while at the same time being able to update C in logarithmic time whenever a slot changes. Assume the memory slot values and the output of the H function have size $2\lambda$bits each, the Merkle tree on an n-sized memory M can be constructed as follows: Without loss of generality, assume n is a power of two, and consider a full binary tree built on top of memory M. For every node $\upsilon$ in the Merkle tree, the T Merkle hash of $\upsilon$, $C_\upsilon$, is computed as follows:

1. If $\upsilon$ is a leaf node, then $C_\upsilon=\text{index }(\upsilon) \| \text{value }(\upsilon)$ (For simplicity of notation, we use $\lambda$ bits for index and $\lambda$ bits for value.)
2. If $\upsilon$'s left child is L and $\upsilon$'s right child is R, then $C_\upsilon=H(C_L \| C_R)$.

The digest of the Merkle tree is the Merkle hash of the root node. The proof for a leaf comprises hashes along the path from the leaf to the root. It can be verified by using hashes in the proof to recompute the root digest C.

BLS signatures. BLS signatures are signatures that can be easily aggregated. For BLS signatures we need a bilinear map $e: G \times G \rightarrow G_T$ over elliptic curve groups and a hash function $H: \{0, 1\}^* \rightarrow G$. Groups G and $G_T$ have prime order p. The secret key is $sk \in Z_p$ and the public key is $g^{sk} \in G$, where g is the generator of G. To sign a message $m \in \{0, 1\}^*$ we output the signature $H(m)^{sk} \in G$.

To verify a signature $s \in G$ on message $m \in \{0, 1\}^*$ given public key $PK \in G$, the verifier checks whether $e(s, g)=e(H(m), PK)$. Given public keys $\{g^{sk_i}\}i=1,\ldots,t$ one can compute an aggregate public key $\prod_{i=1}^{t} g^{sk_i}$. To verify a t-multisignature S on a message m given aggregate public key APK the verifier checks whether $e(S, g)=e(H(m), APK)$. If APK is provably the product of t individual BLS public keys PK, it can be assured that t parties (in particular the owners of the respective secret keys) signed the message.

BLS aggregation can be performed by aggregating all keys involved in a BLS multi signature, to create a "aggregate key." The aggregate key is created from scratch at each signature because the signer set can change. Recproofs as described herein beneficially allows for only updating the aggregate key for the signers that changed between two consecutive signing operators. The cost to prove the aggregate public key is only proportional to the number of signers that got added or remove from one multi-signature to another, i e. cost is proportional to update. This allows to build a fast BLS public key aggregation layer. This layer can improve decentralized application such as notary service that regularly signs common information. For example, Ethereum validators use BLS multisignature to sign on each block. The network needs to verify that the multi signature is correct, comes from valid authorized signers. This step of aggregating public keys together is a significant improvement to efficiency when the number of keys scales to thousands or million.

Vector Commitments (VCs). A vector commitment is a set of algorithms that allow one to commit to a vector of n slots so that later one can open the commitment to values of individual memory slots. One of the most popular implementations of vector commitments are Merkle trees. Vector commitments typically enable more advanced properties than Merkle trees, such as batch proofs (succinct proofs of multiple values). It formalizes VCs below, similar to Catalano and Fiore. The method extends the definition with batch proofs updatability, to capture the new properties introduced by RECKLE TREES.

Definition 2.2 (VC). A VC scheme is a set of PPT algorithms:

Gen $(1^\lambda, n) \rightarrow pp$: Outputs public parameters pp.

$\text{Com}_{pp}$ (a) $\rightarrow$ C: Outputs digest C.

$\text{Open}_{pp}$ (i, a) $\rightarrow \pi_i$: Outputs proof $\pi_i$.

$\text{OpenAll}_{pp}$ (a) $\rightarrow (\pi_0, \ldots, \pi_{n-1})$: Outputs all proofs $\pi_i$.

$\text{Agg}_{pp}$ $((a_i, \pi_i)\ i \in I) \rightarrow (\pi_I, \bigwedge_I)$: Outputs a batch proof $\pi_I$, and a batch-proof data structure $\bigwedge_I$.

$\text{Ver}_{pp}$ $(C, (a_i) i \in I, \pi_{I \rightarrow \{}0, 1\}$: Verifies batch proof $\pi_I$ against C.

$\text{UpdDig}_{pp}$ (u, $\delta$, C, aux) $\rightarrow$ C': Updates digest C to C' to re-flect position u changing by $\delta$ given auxiliary input aux.

$\text{UpdProof}_{pp}$ (u, $\delta$, $\pi_i$, aux) $\rightarrow \pi_i'$: Updates proof $\pi_i$ to $\pi_i'$ to reflect position u changing by $\delta$ given auxiliary input aux.

$\text{UpdBatchProof}_{pp}$ (u, $\delta$, $\pi_i$, $\bigwedge_I$, aux) $\rightarrow (\pi_i', \bigwedge_I')$: Updates batch proof $\pi_I$ to $\pi_i'$ and the batch-proof data structure $\bigwedge_I$ to $\bigwedge_I'$ to reflect position u changing by $\delta$ given auxiliary input aux.

$\text{UpdAllProofs}_{pp}$ (u, $\delta$, $\pi_0, \ldots, \pi_{n-1}) \rightarrow (\pi_0', \ldots, \pi_{n-1}')$ Updates all proofs $\pi_I$ to $\pi_i'$ to reflect position u changing by $\delta$.

It defines VC correctness in Definition 2.3 and VC soundness in Definition 2.4.

Definition 2.3 (VC Correctness). A VC scheme is correct, if for all $\lambda \in N$ and $n=\text{poly}(\lambda)$, for all pp $\leftarrow$ Gen $(1^\lambda, n)$, for all vectors $a=[a_0, \ldots, a_{n-1}]$, if $C=\text{Com}_{pp}$ (a), $\pi_i=\text{Open}_{pp}$ (i, a), $\forall i \in [0, n)$ (or from $\text{OpenAll}_{pp}$ (a)), and $\pi_i=\text{Agg}_{pp}$ $((a_i, \pi_i)_{i \in I})$, $\forall I \subseteq [n]$ then, for any polynomial number of updates (u, $\delta$) resulting in a new vector a', if C' is the updated digest obtained via calls to $\text{UpdDig}_{pp}$, $\pi_i'$ proofs obtained via calls to $\text{UpdProof}_{pp}$ or $\text{UpdAllProofs}_{pp}$ for all i, and $\pi_i'$ are proofs obtained via calls to $\text{UpdBatchProof}_{pp}$ for all subsets/then:

$$Pr[1 \leftarrow Ver_{pp}(C', \{i\}, a_i', \pi_I')] = 1, \forall i \in [n].$$

$$Pr[1 \leftarrow Ver_{pp}(C', I, a_i')_{i \in I}, \pi_I')] = 1, \forall I \subseteq [n].$$

At a high-level, correctness ensures that proofs created via Open or OpenAll verify successfully via Ver, even in the presence of updates and aggregated proofs.

Definition 2.4 (VC Soundness). ∀ PPT adversaries A, $$Pr\begin{bmatrix} pp \leftarrow Gen(1^\lambda, n), \\ \left(C, \{a_i\}_{i \in I}, \{a'_j\}_{j \in J}, \pi_I, \pi_J\right) \leftarrow A(1^\lambda, pp) : 1 \leftarrow Ver_{pp}(C, \{a_i\}_{i \in I}, \pi_I) \wedge \\ 1 \leftarrow Ver_{pp}\left(C, \{a'_j\}_{j \in J}, \pi_J\right) \wedge \exists k \in I \cap J \text{ s.t. } a_k \neq a'_k \end{bmatrix} \leq negl(\lambda).$$

At a high level, soundness ensures that no adversary can output two inconsistent proofs for different values $a_k \neq a_k'$ at position k with respect to an adversarially-produced C.

RECKLE TREES

Methods herein provide RECKLE TREES, a vector commitment scheme which extends Merkle trees to provide updatable batch proofs. Assuming, $n=2^l$, where l is the height of the tree, computing the commitment C of vector $a=[a_0, \ldots, a_{n-1}]$ in RECKLE TREES may comprise: computing the Merkle tree digest of a as described above (e.g., an example of basic implementation may use the Poseidon hash function.) The proof of opening for an index i in the vector is the Merkle membership proof of leaf $a_i$. RECKLE TREES have a new algorithm to aggregate Merkle proofs and compute a batch proof, using recursive SNARKs. The algorithm outputs batch proofs that can be updated in logarithmic time.

Canonical Hashing

Canonical hashing is a deterministic algorithm to compute a digest of subset I of k leaves from a set of $2^l$ leaves. The definition of the canonical hash of a node υ of Merkle tree T with respect to a subset I, denoted d(υ, I), recursively is:
1. If υ is a leaf node we distinguish two cases: If υ's index is in I, then d(υ, I): =index (υ)||value (υ)=$C_υ$, otherwise d(υ, I): =0.
2. If υ has left child L and right child R, then $$d(v, I) := H(d(L, I)||d(R, I)),$$

if $d(L, I)d(R, I) \neq 0$, otherwise $d(v, I) := d(L, I) + d(R, I)$.

Thus, the canonical digest of subset I (denoted as $d_I$ or, simply, d) is the canonical hash of the root node of T for the subset I. Note that when the subset I is unambiguous from the context, it denotes d(υ, I) as $d_υ$. FIG. 1 shows an example of a Merkle tree 100 of 16 leaves. The subset of Merkle leaf indices for which to compute the batch proof may be the subset {2, 4, 5, 15} as shown in FIG. 1. At every node, the canonical hash of that node with respect to the subset {2, 4, 5, 15} 101-1, 101-2, 101-3, 101-4, 101-5, 101-6, 101-7, 101-8, 101-9 is shown. For the nodes with no hash for the subset, their canonical hash is 0. In order to update a batch proof (of a subset I), when some leaves are changing, the batch data structure may be used. The batch data structure for a subset I, $\wedge_I$, consists of all the Merkle hash values, canonical hash values, and recursive SNARK proofs (as computed before) along the nodes (and their siblings) from the leaf nodes in I to the root.

Recursive Circuit

A batch proof is a single short proof that simultaneously proves that a specific subset I of elements belongs in the vector. In the scheme herein, the method implements the batch proof using recursion. In particular, the precise circuit verifies, recursively, that the following NP statement (C, d) is true: "d is the root canonical digest with respect to some set of leaves of some Merkle tree whose root Merkle digest is C."

Note that if there is a proof for the statement above, then it can easily prove that a specific subset of elements $\{a_i\}_{i \in I}$, belongs to the Merkle tree by just locally recomputing the root canonical digest. FIG. 2 shows an example of a recursive circuit B 200 for the statement above. The example shows what the public input of the circuit is and what the (private) witness is. Note that because the circuit is recursive (calling itself), the public input needs to contain a verification key that will be used by the verification call inside the circuit, otherwise, the prover could potentially use an arbitrary verification key (The verification key cannot be hard-coded either since it leads to circularity issues.)

The circuit B works for arbitrary Merkle trees, both balanced and unbalanced. The recursive circuit may take as public input the verifier key (vk), a succinct, collision-resistant representation C of M, and d a subset of C. The private input, called a witness taken as input is a proof π for both the left and right hand (πL and υR, respectively), the left and right hand side of C ($C_L$ and $C_R$, respectively), and the right and left hand side of d (dL and dR, respectively). C is checked to be sure it matches the hash of its left and right hand side combined. The [operation] of $d_L$ and $d_R$ is checked in a binary fashion, if it is not equal to 0 then the equivalence of d and the combined hash of $d_L$ and $d_R$ is checked in a binary fashion, if it is not 0 then the equivalence of d with the sum of $d_L$ and $d_R$ is checked. Either subsequently or in a parallel fashion, dL is checked in a binary fashion, if not equal to 0 a verification algorithm is run on a verification key, a handed proof, and a combination of the verification key and the handed versions of C and d. If no checks fail the circuit returns true. Due to the recursive nature of the circuit, the public input may contain a verification key that may be used by the verification call inside the circuit, otherwise, the prover could potentially use an arbitrary verification key (The verification key cannot be hard-coded either since it leads to circularity issues).

Batch Proof

The method may comprise aggregating individual Merkle proofs $\pi_i$ for an arbitrary set of indices $i \in I$ so that to compute the batch proof. In some cases, a prover may compute the witnesses that are required to run the SNARK proof. For instance, the prover performs the following:
1. The prover computes the tree $T_I$, formed by proofs $\{\pi_i\}_{i \in I}$. For each node υ of $T_I$, the method stores the respective value $C_υ$, that that can be found in or computed from the proofs $\{\pi_i\}_{i \in I}$. For example, in FIG. 1, where I={2, 4, 5, 15}, the nodes of tree $T_I'$ are drawn as rectangles.
2. Let now $T_I' \subset T_I$, be the subtree of $T_I$, that contains just the nodes on the paths from I to the root. The prover computes the canonical hash d(υ, I) for all nodes $υ \in T_I'$ with respect to I. By the definition of the canonical hash, all nodes not included $T_I'$ will have canonical hash equal to 0. For example, in FIG. 1 the canonical hash 101-1, 101-2, 101-3, 101-4, 101-5, 101-6, 101-7, 101-8, 101-9 are computed. All nodes without a canonical hash for the subset have a canonical hash equal to 0.

After computing the witness, the method may proceed with computing the recursive SNARK proofs that eventually will output the batch proof. In some cases, the method may first produce the public parameters by running the setup of the SNARK $(pk_B, vk_B) \leftarrow \text{Setup } (1^\lambda, B)$ for the circuit B. Consider now the set of indices I for which the batch proof is calculated and let $T_I'$ be the subtree as defined above. Let $V_l$ be the nodes of $T_I'$ at level $l=1, \ldots, \ell$. To compute the batch proof, the method follows the procedure below:

for all levels $l=1, \ldots, \ell$ for all nodes $\upsilon \in V_l$

Let L be $\upsilon$'s left child and R be $\upsilon$'s right child in $T_I$;
Set $\pi_\upsilon$ to be the output of $$\text{Prove}(pk_B, (C_\upsilon, d_\upsilon, vk_B), ((C_L, d_L, \pi_L), (C_R, d_R, \pi_R))) \quad (1)$$

The final batch proof for index set I will be $\pi_r$, where r is the root of $T_I$. Note that $\pi_r$ proves the statement (C, d(r, I)) is true, where (C, d(r, I)) is defined above.

Computing the batch proof has parallel complexity $\ell$, independent of |I|. This is because we perform the canonical hashing computation inside the Merkle verification.

How to ensure Merkle leaves are used as witness. In some cases, the circuit illustrated in FIG. 2 may not necessarily consider the leaves of the Merkle tree. For example, given a Merkle tree of 10 levels, it can compute a valid batch proof using the circuit in FIG. 2 even if it discards some of the levels of the tree and just using only, for example, the first three levels. Note that this is not an attack since it is consistent with the public statement that is put forth. However, in the case when the proof is desired to always consider the leaves of the tree, the method may need to assume there is a function leaf ( ) that distinguishes between a Merkle leaf and a Merkle hash. For example, this function may be checking whether the node in question has a particular format, e.g., a bit indicating whether it is a leaf or not (For instance, in Ethereum MPTs, leaves always have a particular format.) In presence of the leaf ( ) function, the method can force a prover to consider leaves by changing lines (3) and (4) in FIG. 2 as follows:

If $d_L \neq 0$ check Verify (vk, (vk, $C_L$, $d_L$), $\pi_L$) $\vee$ $C_L = d_L \wedge \text{leaf}(C_L)$;
and
If $d_R \neq 0$ check Verify (vk, (vk, $C_R$, $d_R$), $\pi_R$) $\vee$ $C_R = d_R \wedge \text{leaf}(C_R)$;

Ensuring the leaves are used as witness may provide advantages in applications, to compute some function on the leaves and prove the result of this computation.

Updating the Batch Proof

In order to update a batch proof (of a subset I), when some leaves are changing, the method may use the batch data structure. The batch data structure for a subset I, $\Lambda_I$, consists of all the Merkle hash values, canonical hash values, and recursive SNARK proofs (as computed before) along the nodes (and their siblings) from the leaf nodes in I to the root, as depicted in FIG. 1) The method may maintain a dynamic batch proof as follows: Whenever a leaf value $a_j$ changes to $a_j'$, the method distinguishes two cases:
1. If the leaf's index j belongs to I, then all canonical hashes, Merkle hashes and SNARK proofs of all nodes from leaf j to the root must be updated;
2. If the leaf's index j does not belong to I, then at least one Merkle hash of a node $\upsilon'$ of the batch data structure will change that will cause other Merkle hashes and related SNARK proofs to change, along the path from $\upsilon'$ to the root.

A similar approach can be used when the size of the batch changes, either by adding or removing elements. In both cases, all updates can be performed in O(log n) time since the height of the batch data structure is log n. Note that the update time is independent of |I|, as opposed to previous approaches where the update requires work proportional to |I|. FIG. 3 shows an example of implementation of the RECKLE TREES algorithms. The implementation uses a collision-resistant hash function H and a SNARK (Setup, Prove, Verify) from Definition 2.1 as black boxes.

Security proof of the algorithm in FIG. 3. To prove that the RECKLE TREES VC scheme, whose detailed implementation is described in FIG. 3 satisfy soundness according to Definition Correctness as described above, it follows easily by inspection.

THEOREM 3.1 (SOUNDNESS OF RECKLE TREES). RECKLE TREES from FIG. 3 are sound per Definition 2.4 assuming collision resistance of the hash function H and knowledge soundness of the underlying SNARK (Setup, Prove, Verify).

PROOF

Gen $(1^\lambda, n) \rightarrow pp$: Let pp contain the following:
The size of the vector n.
A collision-resistant hash function H.
$(pk, vk) \leftarrow \text{Setup } 1^{80}$, B), where B is the circuit in FIG. 2.
$\text{Com}_{pp}$ (a)$\rightarrow$C: Return the Merkle root.
$\text{Open}_{pp}$ (i, a)$\rightarrow \pi_i$: Return the Merkle proof for element $a_i$.
$\text{OpenAll}_{pp}$ (a)$\rightarrow(\pi_0, \ldots, A\pi_{n-1})$: Return the Merkle tree.
$\text{Agg}_{pp}$ $((a_i, \pi_i)_{i \in I}) \rightarrow (\pi_I, \Lambda_I)$:
Using $\{\pi_i\}_{i \in I}$ and I, compute the Merkle hash $C_\upsilon$, and the canonical digest d($\upsilon$, I) for every node in $\upsilon \in E$ $T_i$, where $T_I$ is defined in Section 3.3.
Let $T_I'$ be the subtree of $T_I$, as defined in Section 3.3.
For all nodes $\upsilon$ in $T_I'$ compute $\pi_\upsilon$ as in Equation 1.
Return $\pi_I$, as$\pi_r$ where r is the root of $T_I$ and $\Lambda_I$ as $T_I$, along with the values
$\{(C_\upsilon, d(\upsilon, I), \pi_\upsilon)\}_{\upsilon \in T_I}$ $\text{Ver}_{pp}$ (C, $(a_i)_{i \in I}$, $\pi_I$)$\rightarrow$\{0, 1\}:
Using $(a_i)_{i \in I}$, compute $d_I$ as in Section 3.1.
Return Verify (vk$_B$, (vk$_B$,C, $d_I$), $\pi_I$).
$\text{UpdDig}_{pp}$ (u, $\delta$, C, aux)$\rightarrow$C':
Parse aux as $\pi_u$.
Return the Merkle root after updating to $a_u + \delta$.
$\text{UpdProof}_{pp}$ (u, $\delta$, $\pi_i$, aux)$\rightarrow \pi_i'$:
Parse aux as $\pi_u$.
Recompute the Merkle path after updating to $a_u + \delta$.
Update affected portions of $\pi_i$.
$\text{UpdBatchProof}_{pp}$ (u, $\delta$, $\pi_I$, $\Lambda_I$, aux)$\rightarrow \pi_I'$, $\Lambda_I'$:
Parse aux as $\pi_u$.
Recompute the Merkle path after updating to $a_u + \delta$.
For every node in $_A$ affected by update do the following.
  Update the Merkle hash value.
  Recompute the canonical hash d($\upsilon$, l) if necessary.
  Recompute the SNARK proof $\pi_\upsilon$, as in Equation 1.
  Return the updated $\pi_I$ and $\Lambda_I$.
$\text{UpdAllProofs}_{pp}$ (u, $\delta$, $\pi_0, \ldots, \pi_{n-1})\rightarrow(\pi_0', \ldots, \pi_{n-1}')$:
Parse aux as $\pi_u$.
Recompute the Merkle path after updating to $a_u + \delta$.

Optimized RECKLE TREES Circuit

In some embodiments, the present disclosure provides an improved circuit which beneficially addresses issues that create significant overhead during implementation.

For instance, the circuit (as illustrated in FIG. 2) takes as input SNARK proofs $\pi_R$ and $\pi_L$, that need to be verified. When using a SNARK whose proof size depends on the size of computation (such as in Plonky2 that is used in implementation), the circuit size changes during each recursive call. One method to address this issue is by having an upper bound on the input of the circuit, but this can create additional overhead. For a tree of n leaves, the circuit in FIG. 2 needs to be called n−1 times, equal to the number of internal nodes, leading to n−1 recursive calls. However, note that there is no need to recurse on the leaf nodes—this is the base case of the recursion. Given recursion is the most expensive operation, it is desirable to reduce the number of recursive calls.

The present disclosure may provide an improved circuit addressing the aforementioned issues. The circuit may comprise log n different circuits, one per each level of the tree. In some cases, the size of the circuit is fixed at each level which beneficially ensures the leaf circuit is simple and does not contain any recursive calls (The number of recursive calls will be n/2−1). FIG. 4 shows an example of the batch proof circuits for the Reckle tree. The different circuits may have a fixed size for each level of the tree. Note that the circuit $B_i$ may hardcode the key $vk_{i-1}$ of circuit $B_{i-1}$.

Reducing Recursive Calls with Bucketing

Let r be the concrete cost of recursion and h be the concrete cost of hashing. The approximate concrete parallel complexity (both aggregation and update) of RECKLE TREES is $$f = (l-1) \cdot 2r + l \cdot 2h$$

since at every level of the tree it is required two recursive calls and two hashes, except for the last level where two hashes are performed (not account for conditionals.)

In the implementation above the overhead of recursion is the dominant cost in the circuits, in terms of number of constraints in Plonky2.

To reduce the number of recursive call as much as possible, the method buckets $p=2^q$ leaves together into a monolithic circuit. In this way the following concrete parallel complexity is achieved:

$$g = (l-q) \cdot (2r + 2h) + (2^q - 1) \cdot 2h.$$

This is because for the last q levels of the tree, the bucketing approach will have to compute more hashes ($2^q−1$, as opposed to q) since a monolithic circuit is utilized.

The method may identify the optimal q such that the difference between these parallel complexities be maximum, i e., to maximize the function |f−g| with respect to q. In the example of implementation, where r=450 ms and h=15 ms the optimal q=5.48 (for $\ell$ =27) is identified.

q-ary Reckle Trees

In some embodiments, the method herein can extend RECKLE TREES to q-ary trees. q-ary Reckle trees model batch proof computation for MPT trees (Merkle Patricia Tries) that are used in Ethereum and other blockchain projects. Every node in a q-ary tree has degree at most q (In Ethereum MPT, q=16.) As with Merkle trees, it defines the Merkle hash $c_\upsilon$ of a node in a q-ary tree as $$H(C_1\| \ldots \|C_q).$$

where $C_i$ is the Merkle hash of its i-th child. If some child is missing (and therefore the degree is less than q), it sets the Merkle hash of this child to be null (it can also define the Merkle hash of a node to be the hash of the sorted list that contains the hashes of only those children that are present). The canonical hash $d_\upsilon$ of a node $\upsilon$ with respect to a subset of leaves I is naturally defined as the hash of the sorted list of children that are ancestors of I. The circuit $Q_k$ for batch proof in q-ary tree Reckle tree is shown in FIG. 5. Note that the circuit $Q_k$ is parameterized for k=0, . . . , q.

Note that $Q_k$ is parameterized by k=0, . . . , q, leading to a total of q+1 circuits. A node is represented with 0, 1, . . . , q active children, with respect to the batch I. This allows to avoid executing q recursive calls even when there are fewer than q active children. Note also that the circuit takes also as input the set of all verification key ccc V= $\{vk_0, \ldots, vk_q\}$ to ensure that that prover always uses as verification key in the recursive call a key from a correct, predefined set of keys. In some cases, the method can implement that efficiently by providing a Merkle digest d(V) as public input along with Merkle proofs for the verification keys.

In $Q_k$, Witness 1 contains the Merkle hashes and canonical hashes of v's children, Witness 2 is the alleged subset of Witness 1 consisting of active nodes with respect to the batch, and Witness 3 contains the SNARK proofs and verification keys that will used in the recursive calls. By applying circuit $Q_k$ from the leaves of the batch I to the root, deciding which k to use based on the number of active children that the specific node has, it can prove the following statement. "d is the root canonical digest with respect to some set of leaves of some q-ary Merkle tree whose root Merkle digest is C."

As described above, circuit $Q_k$ takes as input SNARK proofs need to be verified. Since the underlying SNARK is Plonky2, these proofs will have different sizes. One may address this issue either by having an upper bound on the input or, in the case where the q-ary tree has a fixed shape (e.g., a full q-ary tree) by hardcoding the respective verification keys, for the full binary tree.

RECKLE+ TREES FOR VERIFIABLE MAP/REDUCE

The RECKLE+ TREES, an extension of RECKLE TREES can be used to prove the correctness of Map/Reduce-style computations on data committed to by a Merkle tree. RECKLE+ TREES provide Map/Reduce proofs that are easily updatable and can be computed in parallel. Let D and R denote the domain of the input and output of the computation, respectively. Consider the following abstraction for Map/Reduce:

Map: D→R
Reduce: R×R→R

The Reduce operation can also take just a single input. In some cases, the Map/Reduce computation is executed on a subset I ⊆[n] of the memory slots which have d as their canonical digest. The recursive algorithm herein checks the validity of the following NP statement: "out is the output of the Map Reduce computation on some set of leaves which (i) have as their root canonical digest; (ii) belong to some Merkle tree whose Merkle root is C."

FIG. 6 shows an example of map/reduce circuit for RECKLE+ TREES. In FIG. 6, the circuit M verifies the correctness of the Map/Reduce computation. There are various applications of RECKLE+ TREES. The optimized circuit can easily be transformed into log circuits in the same way that B (FIG. 2) was transformed into $B_0$ and $B_i$ (FIG. 4).

Applications

RECKLE+ TREES can enable powerful applications by allowing for proving the correctness of Map/Reduce computation over large amounts of dynamic on-chain state data. Recproofs are generalizable to the Merkle-Patricia Tries used by popular blockchains, such as Ethereum, to store smart contract states. The applications may include, without limitation, digest translation and BLS key aggregation.

Dynamic Digest Translation

Most blockchains such as Ethereum employ MPTs that use hash functions such as SHA-256 or Keccak. Unfortunately, these hash functions are particularly SNARK-unfriendly, meaning that they generate a large number of constraints when turned into circuits so that they can be used by SNARKs. Due to this, it becomes difficult and slow to prove any meaningful computation (e.g., to a smart contract that cannot execute the computation due to limited computational resources) over Ethereum MPT data. On the other hand, there are particularly SNARK-friendly hash functions such as Poseidon that can generate up to 100× less constraints than SHA-256 or Keccak, leading to tremendous savings in prover time. A need exists to enable a digest translation service that can provide proofs equivalence between a Keccak-based digest and a Poseidon-based digest, i.e., that both digests are computed over the same set of leaves. These proofs of equivalence should be easily updatable when new blocks are generated. After there is an equivalence proof, it can then compute a SNARK proof on Poseidon-hashed data much faster.

RECKLE+ TREES can be used for digest translation. The "Map" computation is applied at the leaves as the identity function, and the "Reduce" computation is applied at the internal nodes producing both Keccak and Poseidon hashes of their children (Note that for this application all the leaves are used as the batch index set I.) As new blocks are produced, and some of the Merkle leaves change, this equivalence proof can be updated fast, always being ready to be consumed by a SNARK working with Poseidon-bashed data.

In digest translation it is desirable to compute a cryptographic proof for the following public statement $(C_k, C_p)$.

"$(C_k, C_p)$ is the pair of Keccak/Poseidon Merkle digests on some same set of leaves."

This is useful since it allows for extensively working with SNARK-friendly hashes (such as Poseidon) to compute SNARK proofs, while still being able to verify such Poseidon-based proofs (over dynamic data) against legacy SNARK-unfriendly hashes, such as SHA-256 or Keccak. It can be achieved by attaching the proof of equivalence $(C_k, C_p)$ for the statement above.

In particular, since digest translation is an application of the general Map/Reduce framework, the method can instantiate the Map/Reduce functions as follows:

Map: It is the identity function. It takes as input a leaf and outputs the same leaf.

Reduce: Takes as input two children and outputs the Poseidon hash of these children (assume the initial Merkle tree is built with the Keccak digest.)

Note that while the digest translation for Keccak and Poseidon is described herein, the method has the flexibility to implement it for an arbitrary pair of hash functions. Additionally, note that since for digest translation the "batch" is the set of all the leaves, there is no need to compute the canonical digest. The optimized circuit for digest translation is shown in FIG. 7. FIG. 7 shows an optimized digest translation circuit.

Alternative ways to implement digest translation. The present disclosure provides other methods to implement digest translation. One way to do it is to build a monolithic circuit that builds both a Poseidon and a Keccak tree. Another approach is to have a recursive SNARK proof that takes the proof of digest translation from the previous state, inclusion proofs under both hash functions, and the updated values and digest to compute an updated proof of digest translation using recursive SNARKs. However, this approach is not parallelizable as each update to the tree has to be computed sequentially in the proof one at a time. At the same time, updating the proofs cannot be done with a circuit that is proportional to the number of updates, since the shape of circuit depends on which leaves are updates (Anticipating all possible updates by computing different verification keys will lead to an exponential number of keys.) Due to the exponential issue of the second approach, the monolithic approach is used as the baseline in our implementation. However, the monolithic approach may have significant memory issues.

Another use case for the dynamic digest translation is a new cryptographic tool: multi-set hashing which is unique and specific to Lagrange technological stack. Unlike standard hash functions which take strings as input, multiset hash functions operate on multisets (or sets). They map multisets of arbitrary finite size to strings (hashes) of fixed length. They are incremental in that, when new members are added to the multiset, the hash can be updated in time proportional to the change. The functions may be multiset-collision resistant in that it is difficult to find two multisets which produce the same hash, or just set-collision resistant in that it is difficult to find a set and a multiset which produce the same hash. The dynamic digest translation provided herein beneficially improves the efficiency of the multi-set hashing.

Updatable BLS Key Aggregation

Light clients are used to check the "local correctness" of a block. That is, given a block header h and an alleged set of transactions, a light client would check that these transactions indeed correspond to the specific header h. However, a light client does not have the security of a full node, since it does not check the specific block header h is correct, by going back to genesis. Therefore, the block header that a light client is checking may in principle be bogus. One way to address this issue is to have a certain number of (Ethereum) signers, picked from a fixed set of validators, sign the block header (These signers can be staked and slashed in case they sign a bogus header, offering crypto-economic security.)

In this scenario, the light clients, instead of just receiving the header h, they may receive an aggregate signature sig(h) allegedly signed by a set of at least t signers from a Merkle-committed set of validators with digest d. To verify this aggregate signature, a light client may need an aggregate key apk and a proof for the following public statement (apk, t, d) "apk is the aggregate BLS public key from ≥ t BLS keys derived from the set of BLS keys committed to by d."

RECKLE+ TREES can be used to produce highly parallelizable and updatable proofs for the statement (apk, t, d). Here, the "Map" function selects the leaf public key and sets its counter to 1 if the specific leaf participates in the set of signers, and the "Reduce" function multiplies the aggregate keys of its children, adding their counters accordingly. Note here that the updatability property of RECKLE+ TREES becomes crucial since as new blocks are being produced, the set of signers (as well as the set of validators) may change, in which case computing the proof for the public statement (apk', t, d') could be much faster than recomputing the proof from scratch especially when the delta between the old and new signer/validator sets is small Consider the following setting: BLS public keys of n validators are stored in the memory of a smart contract. The goal is to calculate the aggregated public key of a subset of validators, denoted as I, and the cardinality of this subset I to establish the fraction of validators that have signed the message. However, subset I can change across blocks. The problem of computing aggregated public keys and the cardinality on-chain is useful in emerging real-world blockchain systems (e.g., Proofs of Ethereum Beacon Chain consensus or Eigen Layer restaking). In these systems, validators attest to the results of some specific computational task, and new tasks can arrive periodically. An existing approach is to attach a SNARK proof along with the aggregated public key and the cardinality of the attest or subset. However, this requires recomputing the SNARK proof from scratch every time when the subset changes. Additionally, this also requires computing a new proof from scratch whenever the initial set changes even if the subset stays the same.

RECKLE+ TREES allows to prove that an alleged aggregate BLS public key apk is the product of a subset of t individual BLS keys from a set of BLS keys stored at the leaves of a Merkle tree whose digest is d. At the same time, this proof can be updatable in case this subset changes. For the BLS aggregation application, the Map/Reduce functions is defined as follows:

Map: Takes a public key $g^{sk}$ as input, and returns $(1, g^{sk})$, if sk has signed the message, else $(0, 1_G)$, where $1_G$ is the identity of group G.

Reduce: Takes two elements $(cnt_L, g^{sk_L})$ and $(cnt_R, g^{sk_R})$, and returns $(cnt_L + cnt_R, g^{sk_L} \times g^{sk_R})$.

Figure 9:
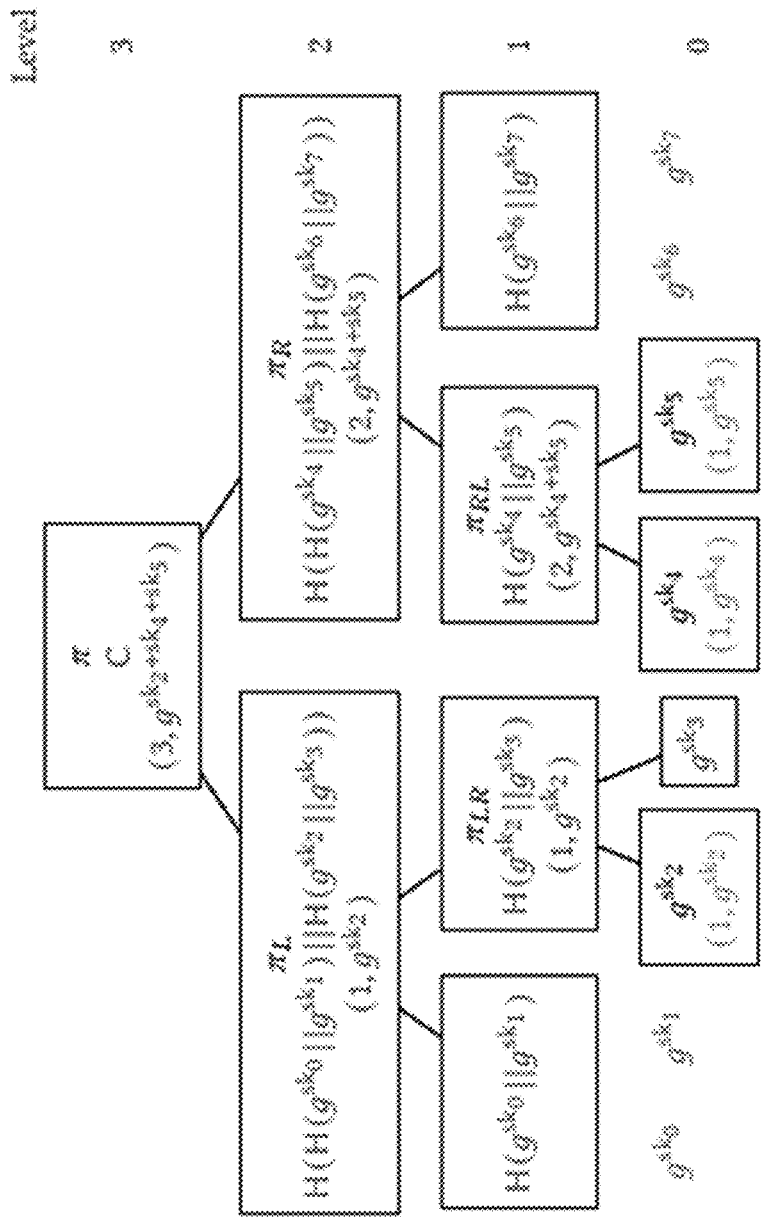
FIG. 9 depicts a non-limiting example of a RECKLE+ TREES data structure to compute the aggregated BLS public key and cardinality of the attestor set.

An example of a circuit for BLS key aggregation is shown in FIG. 8 and an example of the RECKLE+ TREES data structure for BLS key aggregation is shown in FIG. 9. The example shows a RECKLE+ TREES data structure to compute the aggregated BLS public key and cardinality of the attestor set. Consider a vector of size 8 and attestor subset I={2, 4, 5}. Every node υ in the path from root to leaves of I, stores the Merkle hash, the recursive SNARK proof, and results of Map or Reduce operation, and every sibling of υ stores just the Merkle hash. Note that similar to digest translation, there is no need to compute canonical hashing for the BLS key aggregation.

Other applications. The Map/Reduce framework as described herein can be applied to real-world applications involving decentralized finance (DeFi) that require computation over on-chain states that spans multiple concurrent blocks. Examples of these applications include calculating moving averages of asset prices, lending market deposit rates, credit scores or airdrop eligibility. In these applications, a computation must be applied across the states of a contract or group of contracts for the n most recent blocks of a given blockchain, where n is a fixed number. These computations have to then be updated continually whenever new blocks are added to the blockchain. The natural updatability of RECKLE TREES allows it to be extended to use-cases where a proof needs to be generated across tens of thousands of consecutive blocks of historical data.

For example, an on-chain options protocol may want to price an option using the volatility of an asset over the past n blocks on a decentralized exchange on Ethereum. The proof of the volatility has to be updated every 12 seconds as new blocks are added. The naive approach may require computing a proof of the volatility across the past n blocks from scratch, every 12 seconds With RECKLE TREES, this computation may only require updating the portion of the proof associated with the computation done on the oldest block with a proof of computation done on the new block.

Application in Verifiable Database for Smart Contract: A database may be built for each contract containing the values of the contract at each block, i.e. historical data. Contracts do not have the ability to access historical values, such as "what was the price of this pair 100 blocks ago". Applications that require such data needs to handle complicated Merkle proof generation and verification and is often error prone and limited in the type of computation one can run. Running computation on-chain is expensive. Methods and systems herein provide the ability to directly extract all the relevant data, i.e. historical data, and run the computation at the same time on those data. The smart contract only receives the results of the computation and a proof that guarantees it that the data is computed from the right data. This allows smart contract to compute for example historical average for price of tokenized assets, in the realm of "DeFi" applications.

Evaluation

The performance of RECKLE TREES and the applications enabled by Reckle+ TREES is evaluated. Reckle trees are naturally parallelizable regardless of the underlying proof system used to compute recursive SNARK proofs. To realize the benefits of construction, a method for a large scale distributed system for distributed proof generation is disclosed herein.

Distributed Proof Generation

Figure 10:
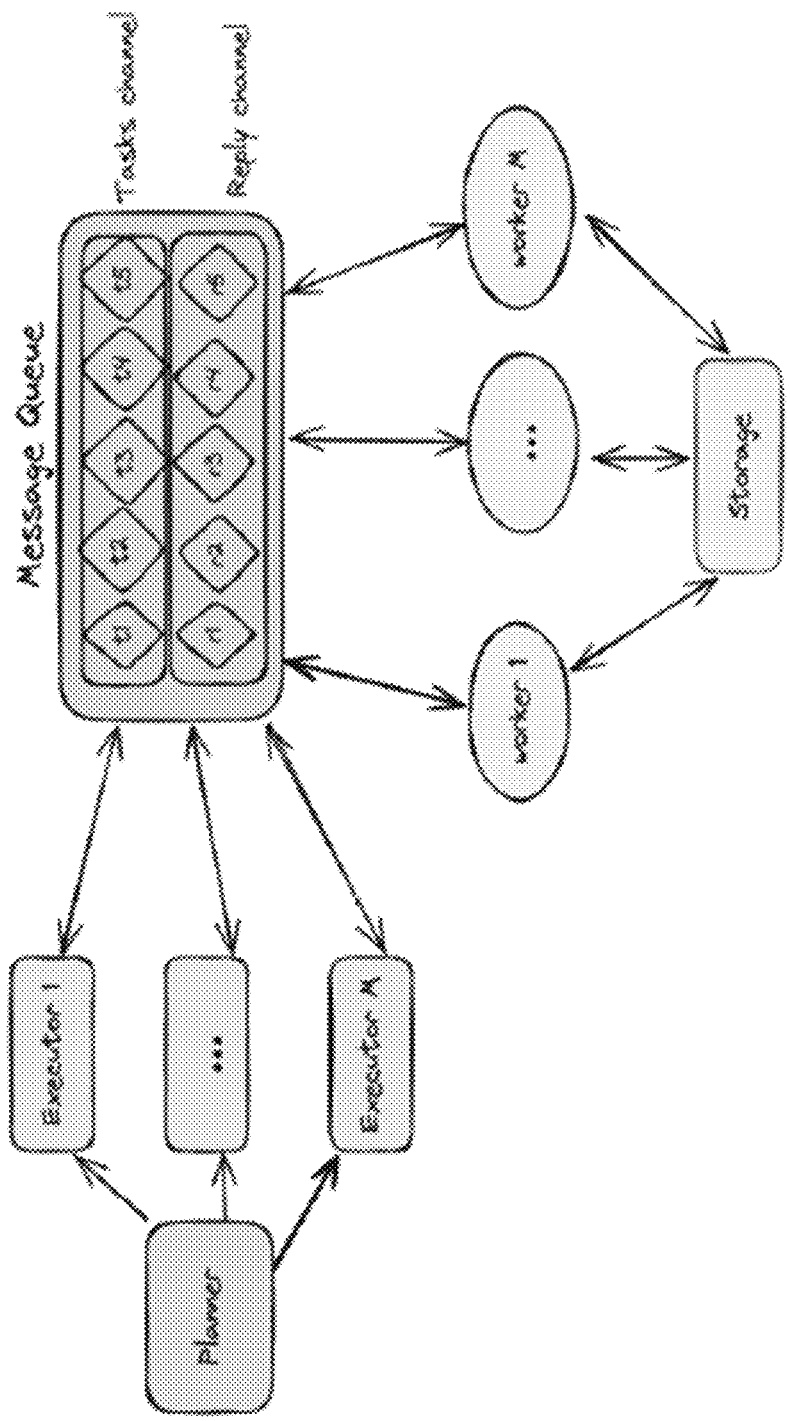
FIG. 10 depicts a non-limiting example of distributed system architecture.

FIG. 10 shows an example architecture of a distributed system, designed to enable efficient proof generation. our distributed system is driven by real-time events, which enables seamless addition of computation resources without degrading the performance. In some embodiments, the system may have five main components: Planner, Executor, Worker, Message Queue, and Storage. The Planner is responsible for dividing a task into subtasks and generating a computational graph structure that describes the dependencies between the subtasks. Using the computational graph from the Planner, the Executor schedules the subtasks for execution by injecting them in the Message Queue and retrieving results of the completed subtasks. The Workers are responsible for fetching subtasks from the message queue, completing the subtasks, and placing the results in the message queue.

The implementation is in Rust language and uses Redis server for messaging. The distributed system is deployed on Kubernetes cluster inside AWS datacenter. The system also heavily relies on AWS S3 storage to store intermediate job results. The test uses AWS c7i.8xlarge EC2 instances (32vCPU, 64 GiB memory) as worker nodes.

Batch Updates and Aggregation

The performance of aggregation, batch update, and batch proof verification is evaluated. The result shows that batch updates in the construction is 11× to 15× faster than baseline, and that the distributed systems can achieve up to 270× performance improvement over the sequential implementation of RECKLE TREES.

The evaluation also compares the performance of the batch operation with prior known Merkle proof aggregation using SNARKs and Inner-product arguments based aggregation in Hyperproofs, which improves upon the Merkle SNARKs aggregation techniques.

The implementation is based on Rust and Plonky2 is used for the batch proof construction. Thus a field element corresponds to a 64-bit value from the Goldilocks field. All experiments were run on Amazon EC2 c7i.8xlarge instance. In all the experiments, the parallelism offered by the underlying framework is utilized. The Merkle tree in the construction and the baseline uses the Poseidon hash function.

Experimental setup. The experiment set the vector size to $n=2^{27}$ and study the performance of the scheme for varying batch sizes $k=\{2^2, 2^4, \ldots, 2^{12}\}$. In each run, it randomly generated a Merkle tree and selected a random set of leaves to batch/update.

For baseline experiments, the following is used:

Merkle proof aggregation using Groth 16 SNARKs. Specifically, the fork of the Rust implementation that was used in Hyperproofs to benchmark Merkle SNARKs is utilized. Inner-product arguments based aggregation in Hyperproofs: it used the golang based implementation that was provided in Hyperproofs.

Note that both these constructions are not easily amenable to distributed proving. Thus baseline experiments were run on a single machine, but the experiment exploited all the parallelism offered by the underlying framework.

The experiment implemented the bucket variant of RECKLE TREES, with bucket size $2^5$ and compare the performance against the above baselines in the following settings:

Standard: In this implementation of aggregation, each node of the batch proof data structure is constructed sequentially on the same machine.

Distributed proof generation: In this implementation of aggregation, the distributed system from is used to compute the SNARK proofs in the batch tree data structure. Specifically, in the experiments, a cluster of 192 workers is used, where each worker is responsible for computing at most three Plonky2 proofs simultaneously.

Public parameters. The proving keys in Hyperproofs and Merkle SNARKs are approximately around 12 GiB and 6 GiB, respectively. This is because, in Hyperproofs, the size of public parameters is linear in the size of the vector. Whereas, in the Merkle SNARKs it is linear in the size of the batch and depth of the Merkle tree. However, in RECKLE TREES, the proving is 3.62 GiB in total, as the prover key in the scheme herein depends only on the depth of the RECKLE TREES tree.

The verification key in the approach herein is at most 1.85 KiB. However, in Hyperproofs and Merkle SNARKs, the verification keys are in the order of around 10 MiB.

Prover time. In FIG. 11a, it shows that the distributed implementation of RECKLE TREES is 3.15× to 270× faster than the sequential implementation.

The distributed version RECKLE TREES has comparable proving time with Groth 16 based Merkle SNARKs aggregation and Hyperproofs. But, the sequential implementation of RECKLE TREES is substantially slower than the baselines. However, this is a one-time cost, but allows fast updates enabling many potential applications.

The aggregation of Hyperproofs outperforms other approaches in FIG. 11a. However, Hyperproofs trades this for a large proof size and increased verification times.

Verification time and proof size. The batch proof in our scheme is 112 KiB. To verify a batch proof, the verifier first needs to compute the canonical digest of the batch. Then the verifier invokes the Plonky2 verifier with the computed canonical digest and the digest of the vector to check the validity of the proof. In the experiments, for a batch size of $2^{12}$ proofs, it takes 14.29 ms to compute the canonical digest and 3.91 ms to verify the Plonky2 proof. The cost of computing canonical digest is shown in FIG. 11b. However, a batch proof in Hyperproofs is 52 KiB and takes around 27.03 seconds to verify.

Batch updates. In the experiments, an element is randomly selected from the batch to update for a sample. The prover cost to update a batch proof is shown. Updating a batch proof in RECKLE TREES involves re-computing the recursive SNARK proofs just along the path from leaf to the root. Thus, it is possible to update the batch proof in logarithmic time. It is shown that the cost of updating a single proof within a batch of $2^{12}$ values is 16.61 seconds.

Figure 11:
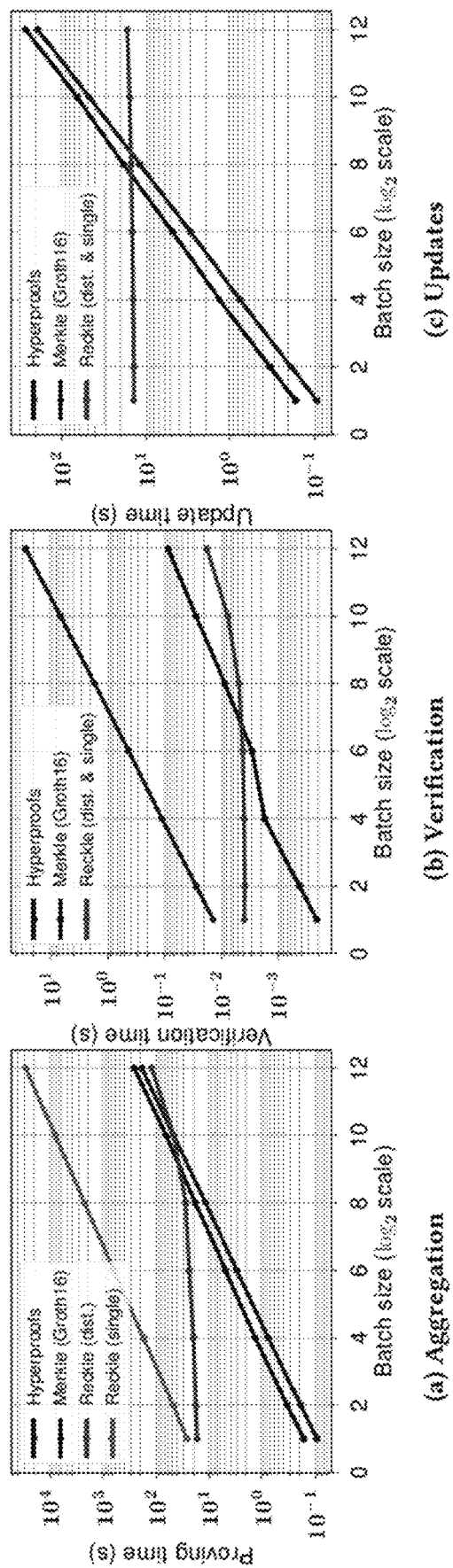
FIG. 11 shows non-limiting graphs of proving times for several canonical methods vs Reckle methods.

However, both Merkle SNARKs and Hyperproofs do not support updatable batch proofs. Thus, both these schemes have to recompute the batch proof from scratch whenever an element in the batch changes. For a batch size of $2^{12}$ values, Merkle SNARKs and Hyperproofs require 3.15 and 4.44 minutes, respectively, to recompute the batch proof. Thus, as shown in FIG. 11c, RECKLE TREES is around 11× and 15× faster than Hyperproofs and Merkle SNARKs, respectively when the batch is $2^{12}$. In FIG. 11, the x-axis is the number of proofs being aggregated, and the experiment used the 128-bit variant of Poseidon.

Besides updating an element inside the batch, the construction herein can also efficiently update the size of the batch. In contrast, both Merkle SNARKs and Hyperproofs require an a priori bound on the maximum size of the batch. Additionally, Merkle SNARKs incur proving cost proportional to the maximum batch size regardless of the number of elements in the batch. Whenever the batch size is insufficient, Merkle SNARKs require a setup with new "powers-of-tau" and circuit specific parameters. RECKLE TREES does not suffer this limitation, allowing for flexibility in adjusting the batch size as required.

Applications of Reckle+ Trees

The performance of RECKLE+ TREES for the digest translation and BLS key aggregation is evaluated. Experimental setup. For both digest translation and BLS public key aggregation, the experiment implemented the RECKLE+ TREES and the baseline circuits in Plonky2. However, experiment used the distributed system with identical configuration, instance types, and the number of workers for the experiments.

For digest translation, the baseline circuit is a monolithic circuit that recomputes the Merkle tree inside the circuit using both Poseidon and Keccak hash functions. Since Plonky2 does not support distributed proving, the baseline is run on a single machine. It is shown that even for trees with 28 leaves, the baseline implementation runs out of memory (64 GiB) while computing the Plonky2 proof. Thus it extrapolates the performance of the baseline implementation for larger tree sizes. However, the distributed variant of RECKLE+ TREES scales even for 8 million leaves.

For the BLS public key aggregation (RECKLE+ TREES and the baseline), it is assumed that the public keys are stored in a Merkle tree of height 21. To implement RECKLE+ TREES, the experiment uses the Plonky2-BN254 library, which implements the BN254 group operations non-natively on Goldilocks field. However, to implement the baseline, the experiment repurposes RECKLE+ TREES's circuit and additionally includes the cost of hashing operations to simulate the membership proof verification. Similar to digest translation, it shows that the baseline implementation runs out of memory while computing a Plonky2 for modestly sized trees. Thus, the experiment extrapolates values for comparison.

Figure 12:
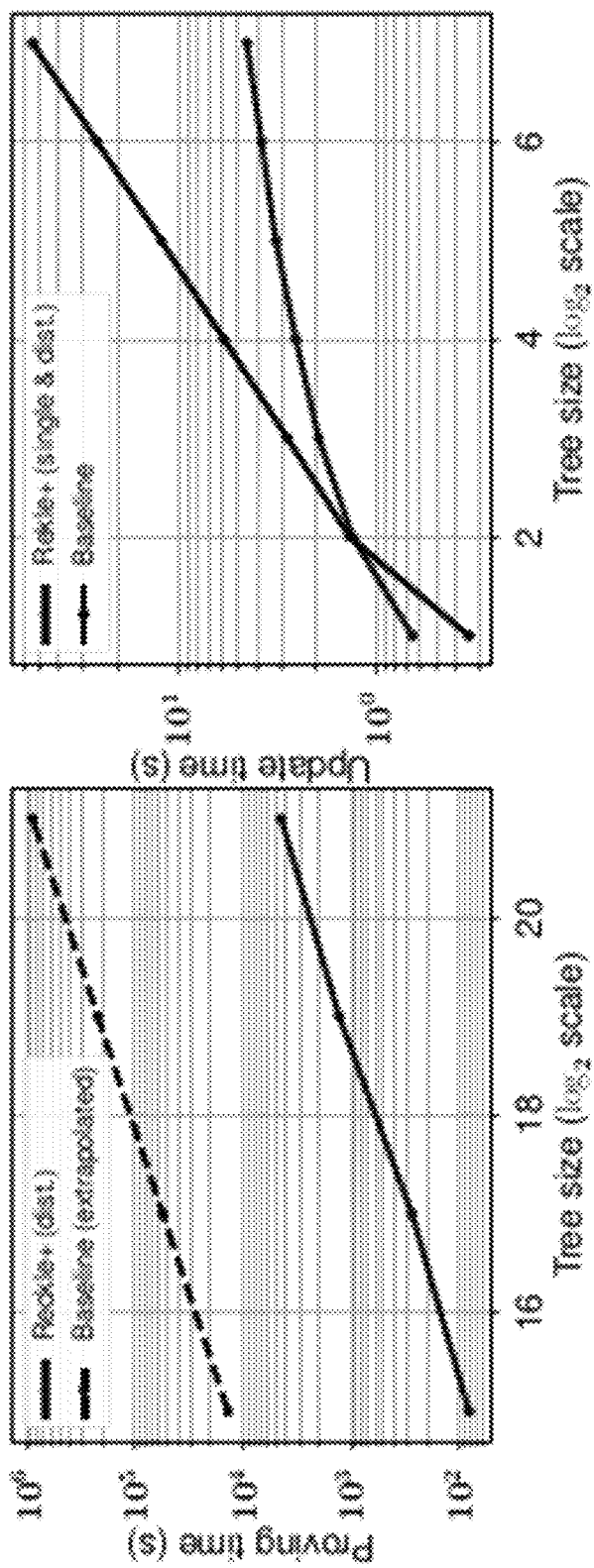
FIG. 12 depicts a non-limiting example of prover and update cost for dynamic digest translation.
Figure 13:
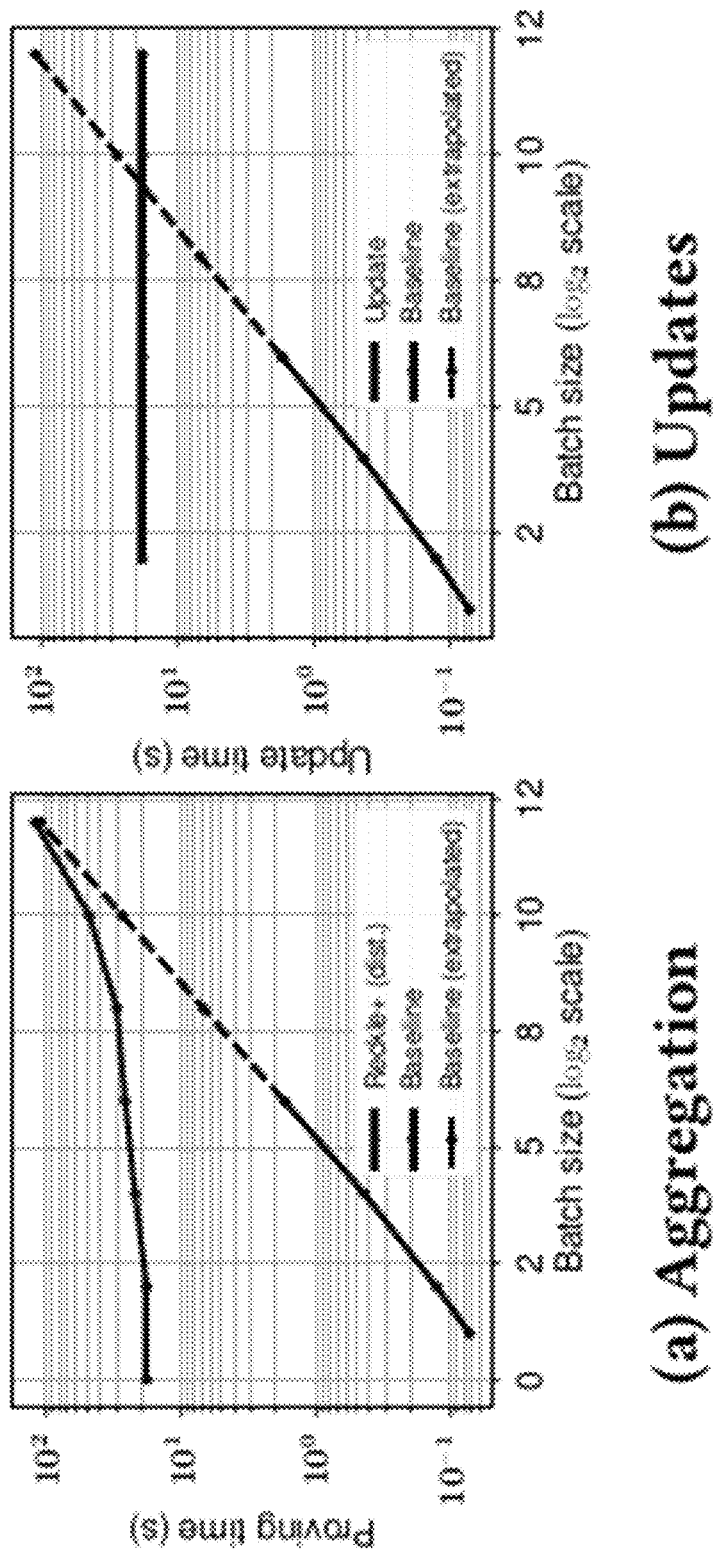
FIG. 13 depicts a non-limiting example of prover and update cost for a BLS application.

Prover. It shows that distributed RECKLE+ TREES takes around 1.25 hours to compute the batch data structure for the digest translation application. However, FIG. 12a shows that RECKLE+ TREES is 200× faster than the baseline implementation. Similarly, for BLS public key aggregation, it shows that RECKLE+ TREES to be faster than the baseline for larger batch sizes. FIG. 12 shows prover and update cost for dynamic digest translation. For height of tree [1, 7], the baseline proving times are [0.34, 1.36, 2.80, 5.86, 12.15, 25.59, 54.21] seconds, respectively.

Updates. For the digest translation application, the cost of a single update is logarithmic in the capacity of the tree. However, the baseline implementation requires work linear in the capacity of the tree. In the experiments, it shows that for tree height of 7, the baseline approach requires 54.21 seconds to update a single leaf. However, RECKLE+ TREES requires 4.49 seconds, which is 12× faster than the baseline. Similarly, in the BLS application, it shows RECKLE+ TREES to be 6× faster than the baseline. The comparable verification times (3-6 ms) and proof sizes (110-120 KiB) are shown for the baseline and RECKLE+ TREES in both applications.

SOUNDNESS PROOF

PROOF OF THEOREM 3.1. Following the notation from Definition 2.4, suppose the adversary outputs a commitment C, two element sets $\{a_i\}_{i \in I}$ and $\{a_j'\}_{i \in I'}$ two batch proofs $\pi_I$ and $\pi_j$ such that the canonical digest of $\{a_i\} \in I$ is d(I), the canonical digest of $\{a_j'\}$ is d(J) and $$1 \leftarrow \text{SNARK.Verify } vk_B,(vk_B,C,d(I)),\pi_j))$$

and $$1 \leftarrow \text{SNARK.Verify } vk_B,(vk_B,C,d(J)),\pi_j))$$

while there exists $k \in I \cap J$, such that $a_k \neq a_k'$.

Due to SNARK knowledge soundness, we can extract the batch-proof data structures $\Lambda_I$ and $\Lambda_J$. Since $k \in I \cap J$, $\Lambda_I$ and $\Lambda_J$ will both contain path $p_k$ in common. Since both the recursive proofs verified, and unless the adversary is able to break collision resistance, all nodes $v$ on these paths (along with their sibling nodes) must have the same Merkle hash values $C_v$. However, the last node that is extracted on $\Lambda_I$'s $p_k$ path has to be $a_k$ (by collision resistance with respect to canonical digest d(I)) and the last node that is extracted on $\Lambda_J$'s $p_k$ path has to be $a_k'$ (by collision resistance with respect to canonical digest d(J)). By assumption, $a_k \neq a_k'$. This is a contradiction. Therefore soundness holds.

Figure 14:
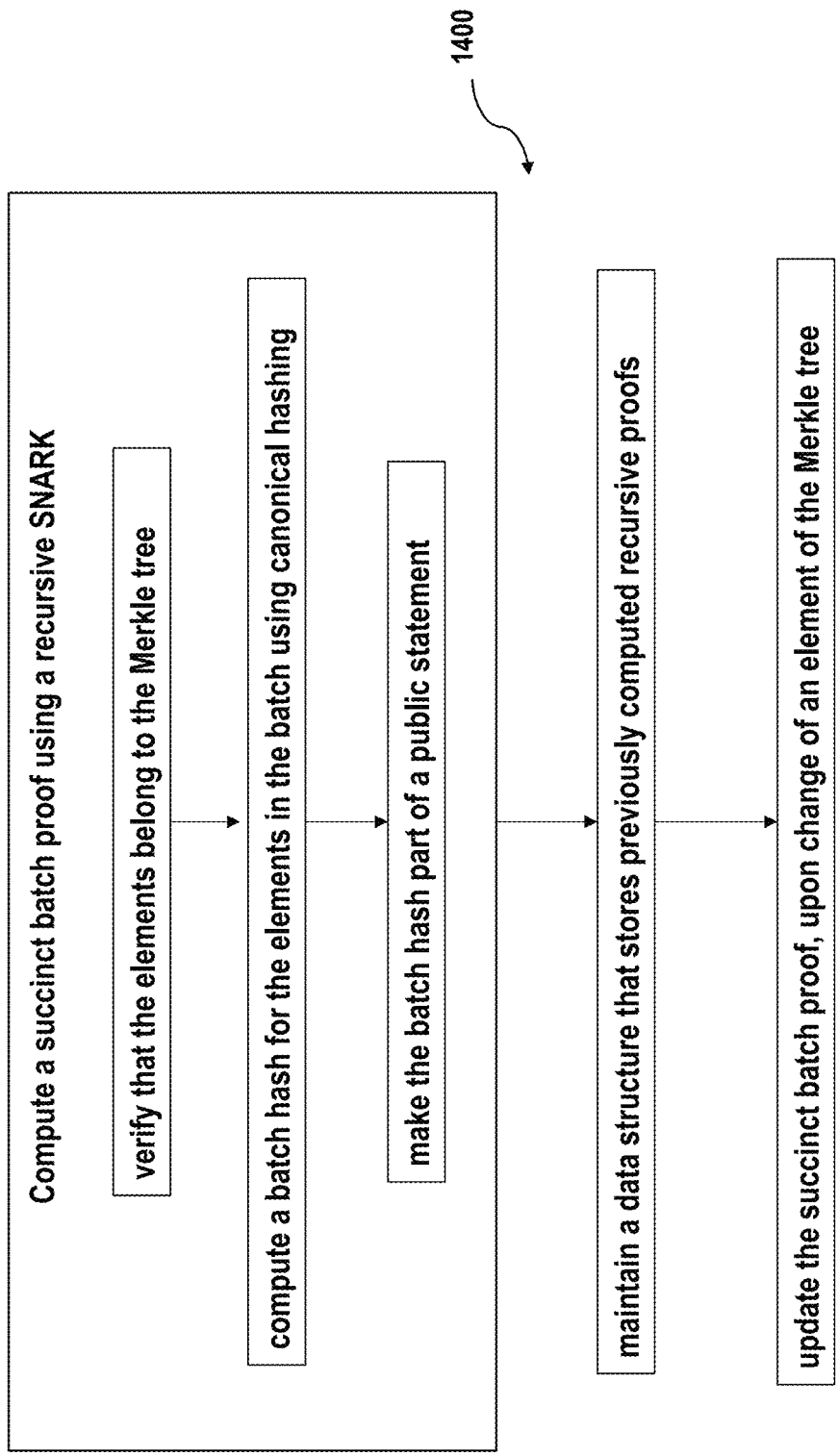
FIG. 14 depicts a non-limiting example of a cryptographic method.

FIG. 14 depicts an example of a cryptographic method 1400. In some embodiments, the cryptographic method is for performing a maintainable Merkle-based vector commitment. The method comprises: computing a succinct batch proof of a subset of k leaves in a Merkle tree of n leaves using a recursive SNARK, where the recursive SNARK is run directly on Merkle paths belonging to elements in the batch to perform the computation of the subset hash inside the computation of the Merkle verification. The method comprises: verifying that the elements belong to the Merkle tree, computing a batch hash for the elements in the batch using canonical hashing, and making the batch hash part of a public statement. The method further comprises maintaining a data structure that stores previously computed recursive proofs and updating the succinct batch proof, upon change of an element of the Merkle tree, in logarithmic time. The method can be used to produce highly parallelizable and updatable proofs for the public statement.

The method herein can be applied in blockchain space. For example, the method for providing parallelizable and updatable batch proofs may be applied in a decentralized network. The method comprises: accessing a first block added to a blockchain; computing a proof of the first block by computing a succinct batch proof of a subset of k leaves in a Merkle tree of n leaves using a recursive SNARK, where the subset of k leaves corresponds to a subset of attestors of the decentralized network; and upon proofing the first block, issuing a token for the proof. The subset of attestors change when a second block is added to the blockchain and such change can be updated with improved efficiency. In some cases, the batch proof is performed by log n different circuits and each of the different circuits has a fixed size corresponding to a level of the Merkle tree.

In some embodiments, a decentralized protocol, run by a plurality of computers, issues a cryptocurrency token via a smart contract, where the token is traded on an exchange. The decentralized protocol incorporates the above system or method so that value of the token is influenced by the market interest in the above system. For instance, the market interest includes usage of the above system.

In some embodiments, the token is used in transacting with the above system, while using the above system, while operating the computer(s) running the above system, and/or rewarding the operators of the computers running the above system. For instance, the token is used to provide economic incentives to operators of the above system so as to enable its operation in a decentralized manner and/or for user of the system to pay for usage of the system.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented cryptographic method of performing a maintainable Merkle-based vector commitment, the method comprising:
   a) computing a succinct batch proof of a subset of k leaves in a Merkle tree of n leaves using a recursive Succinct Non-Interactive Argument of Knowledge (SNARK), wherein the Merkle tree of n leaves is stored on a memory of size n and the succinct batch proof is for multiple memory slots of batch size k, and wherein computing the succinct batch proof comprises:
      i. traversing paths of the Merkle tree belonging to the k leaves in the batch,
      ii. verifying that elements of the k leaves belong to the Merkle tree, iii. computing a batch hash for the elements in the batch using canonical hashing, and iv. making the batch hash part of a public statement;

b) maintaining a data structure that stores previously computed recursive SNARK proofs; and c) upon change of a memory slot of the memory of size n corresponding to an element of the Merkle tree, updating the succinct batch proof for the subset of k leaves stored on the multiple memory slots of batch size k, in O (log n) parallel time independent of the batch size k; and in response to updating the succinct batch proof, issuing a cryptocurrency token via a smart contract.

2. The method of claim 1, wherein the succinct batch proof is computed in parallel in a distributed computing network.

3. The method of claim 1, wherein the data structure stores the previously computed recursive SNARK proofs in a node that is in a path of the Merkle tree that belong to the k leaves in the batch.

4. The method of claim 1, wherein the succinct batch proof size is 112 KiB or less, and is independent of the size of the vector.

5. The method of claim 1, wherein the update to the succinct batch proof is performed in 16.61 seconds, or less, for a tree height of 27.

6. The method of claim 1, wherein the verification is performed in 18.2 ms, or less.

7. The method of claim 1, wherein the element of the Merkle tree changed is in the batch.

8. The method of claim 1, wherein the element of the Merkle tree changed is not in the batch.

9. The method of claim 1, applied to digest translation or updateable Boneh-Lynn-Shacham (BLS) keys aggregation.

10. A computer-implemented system comprising at least one processor and instructions executable by the at least one processor to cause the at least one processor to perform a maintainable Merkle-based vector commitment by performing operations comprising:

a) computing a succinct batch proof of a subset of k leaves in a Merkle tree of n leaves using a recursive Succinct Non-Interactive Argument of Knowledge (SNARK), wherein the Merkle tree of n leaves is stored on a memory of size n and the succinct batch proof is for multiple memory slots of batch size k, and wherein computing the succinct batch proof comprises:

i. traversing paths of the Merkle tree belonging to the k leaves in the batch, ii. verifying that elements of the k leaves belong to the Merkle tree, iii. computing a batch hash for the elements in the batch using canonical hashing, and iv. making the batch hash part of a public statement;

b) maintaining a data structure that stores previously computed recursive SNARK proofs; and c) upon change of a memory slot of the memory of size n corresponding to an element of the Merkle tree, updating the succinct batch proof for the subset of k leaves stored on the multiple memory slots of batch size k, in O (log n) parallel time independent of the batch size k; and in response to updating the succinct batch proof, issuing a cryptocurrency token via a smart contract.

11. The system of claim 10, wherein the data structure stores the previously computed recursive SNARK proofs in a node that is in a path of the Merkle tree that belong to the k leaves in the batch.

12. The system of claim 10, wherein the succinct batch proof is computed in parallel in a distributed computing network.

13. The system of claim 10, wherein the succinct batch proof size is 112 KiB or less, and is independent of the size of the vector.

14. The system of claim 10, wherein the update to the succinct batch proof is performed in 16.61 seconds, or less, for a tree height of 27.

15. The system of claim 10, wherein the verification is performed in 18.2 ms, or less.

16. The system of claim 10, wherein the element of the Merkle tree changed is in the batch.

17. The system of claim 10, wherein the element of the Merkle tree changed is not in the batch.

18. The system of claim 10, wherein the maintainable Merkle-based vector commitment is applied to digest translation or updateable Boneh-Lynn-Shacham (BLS) keys aggregation.

19. One or more non-transitory computer-readable storage media encoded with instructions executable by one or more processors to create an application for performing a maintainable Merkle-based vector commitment, the application comprising:

a) a software module computing a succinct batch proof of a subset of k leaves in a Merkle tree of n leaves using a recursive Succinct Non-Interactive Argument of Knowledge (SNARK), wherein the Merkle tree of n leaves is stored on a memory of size n and the succinct batch proof is for multiple memory slots of batch size k, and wherein computing the succinct batch proof comprises:

i. traversing paths of the Merkle tree belonging to the k leaves in the batch, ii. verifying that elements of the k leaves belong to the Merkle tree, iii. computing a batch hash for the elements in the batch using canonical hashing, and iv. making the batch hash part of a public statement;

b) a software module maintaining a data structure that stores previously computed recursive SNARK proofs; and c) a software module, upon change of a memory slot of the memory of size n corresponding to an element of the Merkle tree, updating the succinct batch proof, for the subset of k leaves stored on the multiple memory slots of batch size k in O (log n) parallel time independent of the batch size k; and in response to updating the succinct batch proof, issuing a cryptocurrency token via a smart contract.

20. The non-transitory computer-readable storage media of claim 19, wherein the data structure stores the previously computed recursive SNARK proofs in a node that is in a path of the Merkle tree that belong to the k leaves in the batch.

21. The non-transitory computer-readable storage media of claim 19, wherein the succinct batch proof is computed in parallel in a distributed computing network.

22. The non-transitory computer-readable storage media of claim 19, wherein the application further comprises a software module performing digest translation or updateable Boneh-Lynn-Shacham (BLS) keys aggregation.

23. A computer-implemented method for providing parallelizable and updatable batch proofs in a decentralized network, the method comprising:

a) accessing a first block added to a blockchain;
b) computing a proof of the first block by computing a succinct batch proof of a subset of k leaves in a Merkle tree of n leaves using a recursive Succinct Non-Interactive Argument of Knowledge (SNARK), wherein computing the succinct batch proof comprises traversing paths of the Merkle tree belonging to the k leaves in the batch, and wherein the subset of k leaves correspond to a subset of attestors of the decentralized network; and
c) upon proofing the first block, issuing a token for the proof.

24. The computer-implemented method of claim 23, wherein the subset of attestors change when a second block is added to the blockchain.

25. The computer-implemented method of claim 23, wherein computing the succinct batch proof further comprises verifying that elements of the k leaves belong to the Merkle tree and computing a batch hash for the elements in the batch using canonical hashing.

26. The computer-implemented method of claim 23, wherein the succinct batch proof is performed by log n different circuits.

27. The computer-implemented method of claim 26, wherein each of the different circuits has a fixed size corresponding to a level of the Merkle tree.

28. The method of claim 1, wherein updating the succinct batch proof for the subset of k leaves stored on the multiple memory slots of batch size k comprises outputting a verifying proof of an updated public statement without recomputing the succinct batch proof from scratch.

29. The system of claim 10, wherein updating the succinct batch proof for the subset of k leaves stored on the multiple memory slots of batch size k comprises outputting a verifying proof of an updated public statement with out recomputing the succinct batch proof from scratch.

30. The non-transitory computer-readable storage media of claim 19, wherein updating the succinct batch proof for the subset of k leaves stored on the multiple memory slots of batch size k comprises outputting a verifying proof of an updated public statement without recomputing the succinct batch proof from scratch.

* * * * *